US012678948B2

(12) United States Patent
    Eskandary et al.

(10) Patent No.: US 12,678,948 B2
(45) Date of Patent: Jul. 14, 2026

(54) METHOD AND SYSTEM OF GENERATING A FEASIBLE SMOOTH REFERENCE TRAJECTORY FOR AN ACTUATOR

(71) Applicant: Sanctuary Cognitive Systems Corporation, Vancouver (CA)

(72) Inventors: Peyman Karimi Eskandary, Coquitlam (CA); Alejandro Hernandez Herdocia, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 212 days.

(21) Appl. No.: 18/432,400

(22) Filed: Feb. 5, 2024

(65) Prior Publication Data

US 2024/0286280 A1     Aug. 29, 2024

Related U.S. Application Data

(60) Provisional application No. 63/448,139, filed on Feb. 24, 2023.

(51) Int. Cl.
    *B25J 9/16* (2006.01)
(52) U.S. Cl.
    CPC ............ *B25J 9/1651* (2013.01); *B25J 9/1689* (2013.01)
(58) Field of Classification Search
    CPC .................. B25J 9/1651; B25J 9/1689; G05B 2219/39338
    See application file for complete search history.

(56) References Cited

U.S. PATENT DOCUMENTS

| | | | | | |
|---|---|---|---|---|---|
| 6,216,058 B1 * | 4/2001 | Hosek | .................... | B25J 9/1664 414/217 |
| 6,294,891 B1 * | 9/2001 | McConnell | .............. | G05B 5/01 700/32 |
| 7,448,294 B2 * | 11/2008 | Webb | ..................... | G05B 19/41 74/490.01 |

(Continued)

FOREIGN PATENT DOCUMENTS

| | | | | | |
|---|---|---|---|---|---|
| CN | 111251297 A | * | 6/2020 | ............ | B25J 9/1682 |
| CN | 116572237 A | * | 8/2023 | ................ | B25J 9/16 |

(Continued)

OTHER PUBLICATIONS

JP-2009269102-A translation (Year: 2009).*
JP-2013184826-A translation (Year: 2013).*
FR-3045848-A1 translation (Year: 2017).*
CN-111251297-A translation (Year: 2020).*
CN-119858162-A translation (Year: 2025).*
Optimal_Trajectory_Generation_and_Precision_Tracking_Control (Year: 2004).*

(Continued)

*Primary Examiner* — Kyle T Johnson
(74) *Attorney, Agent, or Firm* — Adenike Adebiyi; Thomas Mahon

(57) ABSTRACT

A method of controlling an actuator having a maximum velocity and a maximum acceleration includes accessing a reference trajectory signal comprising temporally-spaced reference positions for the actuator and accessing a trajectory template having at least a third derivative continuity and at least one characteristic constrained by the maximum velocity and the maximum acceleration. The method includes generating a smooth reference trajectory signal based on the reference trajectory signal and the trajectory template and outputting the smooth reference trajectory signal. Controls for the actuator can be generated based on the smooth reference trajectory signal.

23 Claims, 15 Drawing Sheets

(56)              References Cited

U.S. PATENT DOCUMENTS

| | | | |
|---|---|---|---|
| 2004/0098160 A1* | 5/2004 | Galburt | G03F 7/70725 |
| | | | 700/121 |
| 2007/0138992 A1* | 6/2007 | Prisco | A61B 34/70 |
| | | | 318/568.21 |
| 2017/0066130 A1* | 3/2017 | Corkum | B25J 9/1676 |
| 2018/0012789 A1* | 1/2018 | Handa | B25J 9/042 |
| 2018/0093868 A1* | 4/2018 | Claeys | B66C 13/063 |
| 2018/0136623 A1* | 5/2018 | Mattil | B25J 9/1664 |
| 2019/0143506 A1* | 5/2019 | Rabindran | B25J 3/04 |
| | | | 700/253 |
| 2020/0180151 A1* | 6/2020 | Ryan | B25J 9/1664 |
| 2020/0239111 A1* | 7/2020 | Zijlmans | B63B 27/14 |
| 2020/0306966 A1* | 10/2020 | Falkenhahn | G05B 19/0426 |
| 2021/0001483 A1* | 1/2021 | Milenkovic | B25J 9/1666 |
| 2022/0015846 A1* | 1/2022 | Li | A61B 34/30 |
| 2024/0130813 A1* | 4/2024 | Tanzini | A61B 34/37 |
| 2024/0286280 A1* | 8/2024 | Karimi Eskandary | |
| | | | B25J 9/1651 |

FOREIGN PATENT DOCUMENTS

| | | | | | |
|---|---|---|---|---|---|
| CN | 119858162 A | * | 4/2025 | | B25J 9/16 |
| FR | 3045848 A1 | * | 6/2017 | | B25J 9/1633 |
| JP | 2009269102 A | * | 11/2009 | | B25J 9/1633 |
| JP | 2013184826 A | * | 9/2013 | | B66C 13/085 |

OTHER PUBLICATIONS

Practical time-delay control with adaptive gains for trajectory tracking of robot manipulators (Year: 2018).*
Smooth_and_Time-Optimal_Trajectory (Year: 2008).*
Trajectory_planning_and_control_for_robot_manipulations_ (Year: 2016).*
Joint_Smoothing_and_Tracking_Based_on_Continuous_Time_ Target_Trajectory_Function_Fitting2019 (Year: 2019).*
CN_116572237_A_I_translation (Year: 2023).*

* cited by examiner

METHOD AND SYSTEM OF GENERATING A FEASIBLE SMOOTH REFERENCE TRAJECTORY FOR AN ACTUATOR

CROSS-REFERENCE TO RELATED APPLICATIONS

This application claims the benefit of U.S. Provisional Application No. 63/448,139 filed Feb. 24, 2023, the content of which is incorporated herein by reference.

FIELD

The field generally relates to robot operation and control and in particular to control of actuators in robotic joints.

BACKGROUND

Robots are machines that can sense their environments and perform tasks semi-autonomously, autonomously, or via teleoperation. Humanoid robots are robots having an appearance or character resembling that of a human. There is considerable interest in developing humanoid robots that can function as collaborators with humans in diverse applications, such as construction, manufacturing, monitoring, exploration, learning, and entertainment. Humanoid robots can be particularly advantageous in substituting for humans in environments that may be dangerous to humans or uninhabitable by humans.

When a humanoid robot is performing a task or interacting with an object or environment, the robot may need to have a certain spatial pose or make a certain humanlike movement or gesture. The robot can include robotic joints that can be actuated to achieve the desired spatial pose, movement, or gesture. The actuators can have associated controllers that receive joint trajectories and then control the actuators to desired positions based on the joint trajectories. There are many ways in which unfeasible joint trajectories (e.g., joint trajectories that do not respect the capabilities of the actuators or are noisy or are non-smooth) can be generated from operation of the robot. There is a need to avoid providing unfeasible joint trajectories to the controllers.

SUMMARY

Disclosed herein are example methods and systems that can generate a feasible trajectory given an original trajectory (such as a trajectory generated based on joint trajectories). The feasible trajectory is a smooth trajectory having continuity up to at least the third derivative, which means that velocity, acceleration, and jerk are bounded. The smooth trajectory can be constrained based on maximum velocity and maximum acceleration specified for the actuator.

In a first representative example, a method of controlling an actuator having a maximum velocity and a maximum acceleration includes accessing a reference trajectory signal comprising temporally-spaced reference positions for the actuator. The method includes accessing a trajectory template having at least a third derivative continuity and at least one characteristic constrained by the maximum velocity and the maximum acceleration. The method includes generating a smooth reference trajectory signal based on the reference trajectory signal and the trajectory template and outputting the smooth reference trajectory signal (e.g., to a controller of the actuator or a storage media communicatively coupled to a controller of the actuator).

In a second representative example, a method of controlling an actuator includes generating a trajectory template from a jerk profile (e.g., a jerk profile having desirable jerk characteristics from the viewpoint of actuator control). The method includes adjusting at least one characteristic of the trajectory template based on a maximum velocity and a maximum acceleration associated with the actuator. The method includes generating a delayed trajectory from a first reference trajectory signal comprising first temporally-spaced reference positions. The delayed trajectory comprises an array of delayed signals sampled from the first reference trajectory signal at a first sampling rate. The method includes generating a smooth reference trajectory signal based on the delayed trajectory and the master trajectory template. The method includes outputting the smooth reference trajectory signal (e.g., to a controller of the actuator or a storage media communicatively coupled to a controller of the actuator).

In a third representative example, a system includes an actuator, a first controller, a second controller, and a trajectory preprocessor communicatively coupled to the first controller and the second controller. The actuator comprises a motor and a motor driver and has a maximum velocity and a maximum acceleration. The first controller is configured to output a first reference trajectory signal comprising temporally-spaced reference positions. The second controller is configured to generate controls for the motor driver based on a smooth reference trajectory signal. The trajectory preprocessor comprises a first processing block, a second processing block, a third processing block, and a fourth processing block. The first processing block is configured to receive samples of the first reference trajectory signal outputted by the first controller and enforce the maximum velocity on the samples of the first reference trajectory signal to obtain a second reference trajectory signal. The second processing block is configured to generate a delayed trajectory comprising an array of delayed signals sampled from the second reference trajectory signal. The third processing block is configured to generate a trajectory template having at least a third derivative continuity and at least one characteristic constrained by the maximum velocity and the maximum acceleration. The fourth processing block is configured to generate the smooth reference trajectory signal based on the delayed trajectory and the trajectory template.

In a fourth representative example, one or more non-transitory computer-readable storage media store computer-executable instructions that when executed perform operations including receiving samples of an original reference trajectory signal at a sampling rate from a high-level controller, wherein the original reference trajectory signal comprises temporally-spaced reference positions for an actuator, enforcing a maximum velocity on the samples of the original reference trajectory signal to obtain a velocity-constrained reference trajectory signal, generating a delayed trajectory comprising a plurality of delayed signals sampled from the velocity-constrained reference trajectory signal, generating a master trajectory template from a jerk profile, generating a smooth reference trajectory signal based on the delayed trajectory and the master trajectory template, and outputting the smooth reference trajectory signal to a low-level controller, wherein the low-level controller generates a control for a motor driver of the actuator based on the smooth reference trajectory signal.

DETAILED DESCRIPTION

Figure 1:
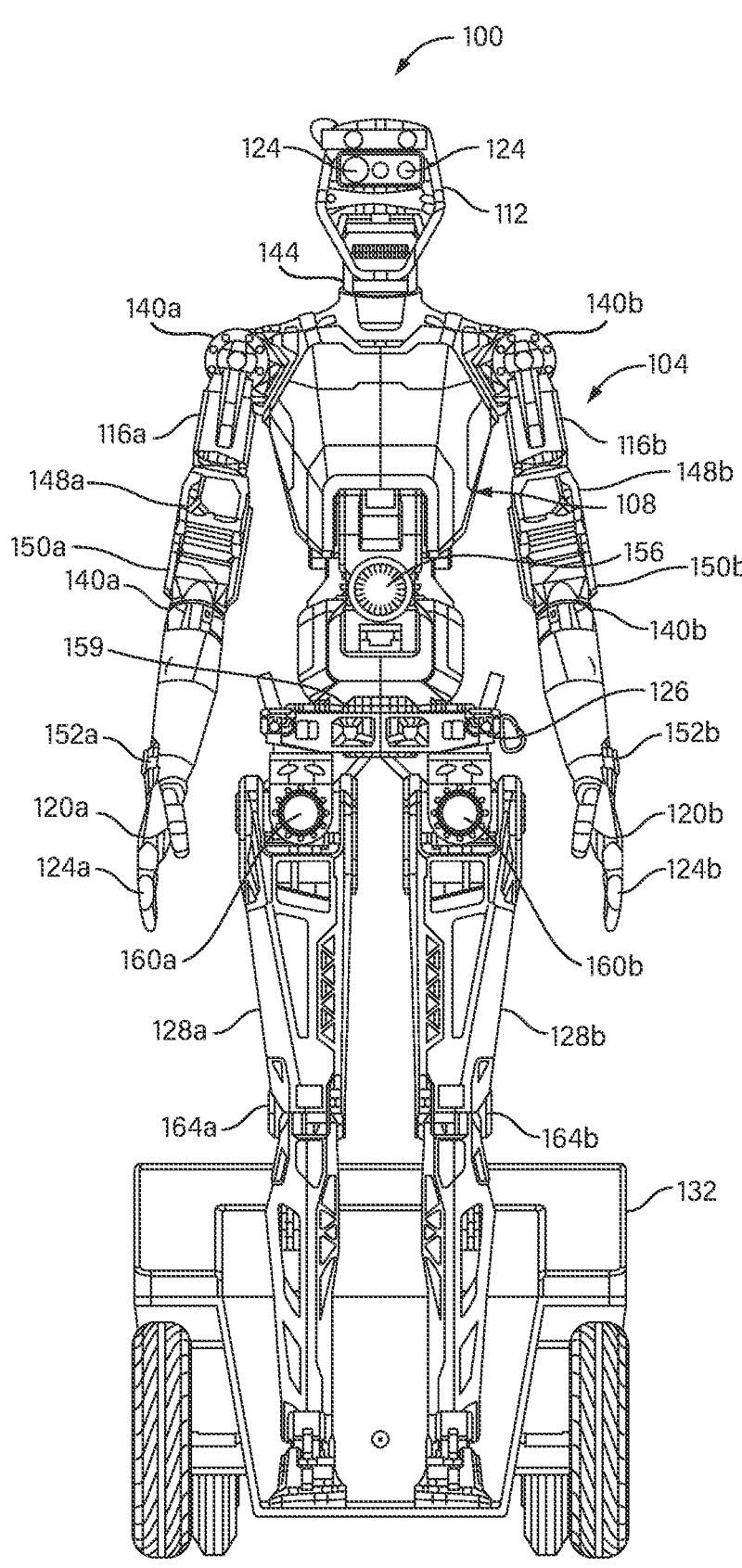
FIG. 1 is a front view of an example robot on a mobile base.

For the purpose of this description, certain specific details are set forth herein in order to provide a thorough understanding of disclosed technology. In some cases, as will be recognized by one skilled in the art, the disclosed technology may be practiced without one or more of these specific details, or may be practiced with other methods, structures, and materials not specifically disclosed herein. In some instances, well-known structures and/or processes associated with robots have been omitted to avoid obscuring novel and non-obvious aspects of the disclosed technology.

All the examples of the disclosed technology described herein and shown in the drawings may be combined without any restrictions to form any number of combinations, unless the context clearly dictates otherwise, such as if the proposed combination involves elements that are incompatible or mutually exclusive. The sequential order of the acts in any process described herein may be rearranged, unless the context clearly dictates otherwise, such as if one act or operation requests the result of another act or operation as input.

In the interest of conciseness, and for the sake of continuity in the description, same or similar reference characters may be used for same or similar elements in different figures, and description of an element in one figure will be deemed to carry over when the element appears in other figures with the same or similar reference character, unless stated otherwise. In some cases, the term "corresponding to" may be used to describe correspondence between elements of different figures. In an example usage, when an element in a first figure is described as corresponding to another element in a second figure, the element in the first figure is deemed to have the characteristics of the other element in the second figure, and vice versa, unless stated otherwise.

The word "comprise" and derivatives thereof, such as "comprises" and "comprising", are to be construed in an open, inclusive sense, that is, as "including, but not limited to". The singular forms "a", "an", "at least one", and "the" include plural referents, unless the context dictates otherwise. The term "and/or", when used between the last two elements of a list of elements, means any one or more of the listed elements. The term "or" is generally employed in its broadest sense, that is, as meaning "and/or", unless the context clearly dictates otherwise. When used to describe a range of dimensions, the phrase "between X and Y" represents a range that includes X and Y. As used herein, an "apparatus" may refer to any individual device, collection of devices, part of a device, or collections of parts of devices.

The term "coupled" without a qualifier generally means physically coupled or lined and does not exclude the presence of intermediate elements between the coupled elements absent specific contrary language. The term "plurality" or "plural" when used together with an element means two or more of the element. Directions and other relative references (e.g., inner and outer, upper and lower, above and below, and left and right) may be used to facilitate discussion of the drawings and principles but are not intended to be limiting.

The headings and Abstract are provided for convenience only and are not intended, and should not be construed, to interpret the scope or meaning of the disclosed technology.

Example I—Overview

A robot can include several robotic joints that can be actuated, for example, to allow the robot to achieve a desired spatial pose, movement, or gesture. When a robotic joint needs to be actuated to achieve a desired joint motion, a reference trajectory is sent to the controller of the actuator associated with the robotic joint. The reference trajectory is a time-based prescription for the actuator (e.g., a particular position the actuator should be in at a particular time). The reference trajectory can be a live trajectory, wherein positions in the reference trajectory are streamed to the controller in real time, or a preplanned trajectory, wherein positions in the reference trajectory are sent to the controller in a batch. There are many ways in which a reference trajectory can be unfeasible (e.g., the reference trajectory may require velocity, acceleration, or jerk that violates maximum velocity, acceleration, or jerk prescribed for the actuator, or the reference trajectory may be noisy or non-smooth). In some cases, such unfeasible reference trajectories can result in poor functioning of the robot and controller.

Described herein are technologies that enable the robot system to avoid providing unfeasible reference trajectories to the controller of an actuator (e.g., an actuator in a robotic joint). The technologies can receive an original reference trajectory for a target actuator and generate a feasible reference trajectory based on the reference trajectory. The feasible reference trajectory is a smooth reference trajectory with at least a third derivative continuity and can be constrained by a maximum velocity and a maximum acceleration specified for operation of the actuator. The technologies can provide the feasible reference trajectory to the controller (e.g., an impedance controller) of the actuator. The controller can interact with a motor driver to provide current to a motor of the actuator at a rate and magnitude based on the desired actuator position indicated in the feasible reference trajectory.

Example II—Example Robot with Robotic Joints

FIG. 1 illustrates an example robot 100 having robotic joints that are actuatable. Although the robot 100 is illustrated as a humanoid robot, the examples described herein are not limited to humanoid robots (e.g., non-humanoid robots can also have robotic joints that are actuatable). Moreover, how closely the robot 100 approximates the human anatomy can be selected for a given application (e.g., the robot can have greater or fewer anatomical features than shown in FIG. 1).

In the illustrated example, the robot 100 includes a robot body 104 having a robotic torso 108, a robotic head 112, robotic arms 116a, 116b, and robotic hands 120a, 120b. The robotic arms 116a, 116b are coupled to opposite sides of the robotic torso 108. The robotic hands 120a, 120b (or end effectors) are coupled to the free ends of the robotic arms 120a, 120b. The robotic hands 120a, 120b can include one or more digits 124a, 124b (or articulable members), which the robot 100 can use to interact with objects in the environment or to make gestures.

The robotic head 112 can include one or more vision sensors 124 (e.g., cameras) that capture visual data representing an environment of the robot. The robot 100 can include other sensors that can collect data representing the environment of the robot (e.g., audio sensors, tactile sensors, accelerometers, inertial sensors, gyroscopes, temperature sensors, humidity sensors, or radiation sensors). These other sensors can be coupled to surfaces of the robot 100 exposed to the environment.

In the illustrated example, the robot 104 includes robotic legs 128a, 128b, which are coupled to the robotic torso 108 by a robotic hip 126. In the illustrated example, the robotic legs 128a, 128b are attached to (or mounted on) a mobile base 132 (e.g., a wheeled base). In some examples, the robot 100 can be bipedal (e.g., the robot 100 can walk with the robotic legs 128a, 128b). In other examples, the robot 100 may not have any robotic legs and can still be considered to have a humanoid form. In these other examples, the robotic torso 108 can include a base mounted on a pedestal, which can be attached to (or mounted on) a mobile base.

The robot 100 can include several robotic joints. For example, the robot 100 can include shoulder joints 140a, 140b between the robotic arms 116a, 116b and the robotic torso 108. A neck joint 144 can be formed between the robotic head 112 and the robotic torso 108. The robotic arms 116a, 116b can include elbow joints 148a, 150a, 148b. 150b. Wrist joints 152a, 152b can be formed between the robotic arms 116a, 116b and the robotic hands 120a, 120b. The robotic torso 108 can include one or more robotic joints, such as a robotic joint 156 that allows flexion-extension of the torso and a robotic joint 159 that allows rotation of the robotic torso 108. The robotic joint 159 can couple the robotic torso 108 to the robotic hip 126. Hip joints 160a, 160b can be formed between the robotic hip 126 and the robotic legs 128a, 128b. The robotic legs 128a 128b can include one or more robotic joints, such as robotic joints 164a, 164b that allow bending of the robotic legs 128a, 128b. The robotic joints can include actuators that can be controlled to move the joints.

Example III—Example Robotic Joint Actuation System

Figure 2:
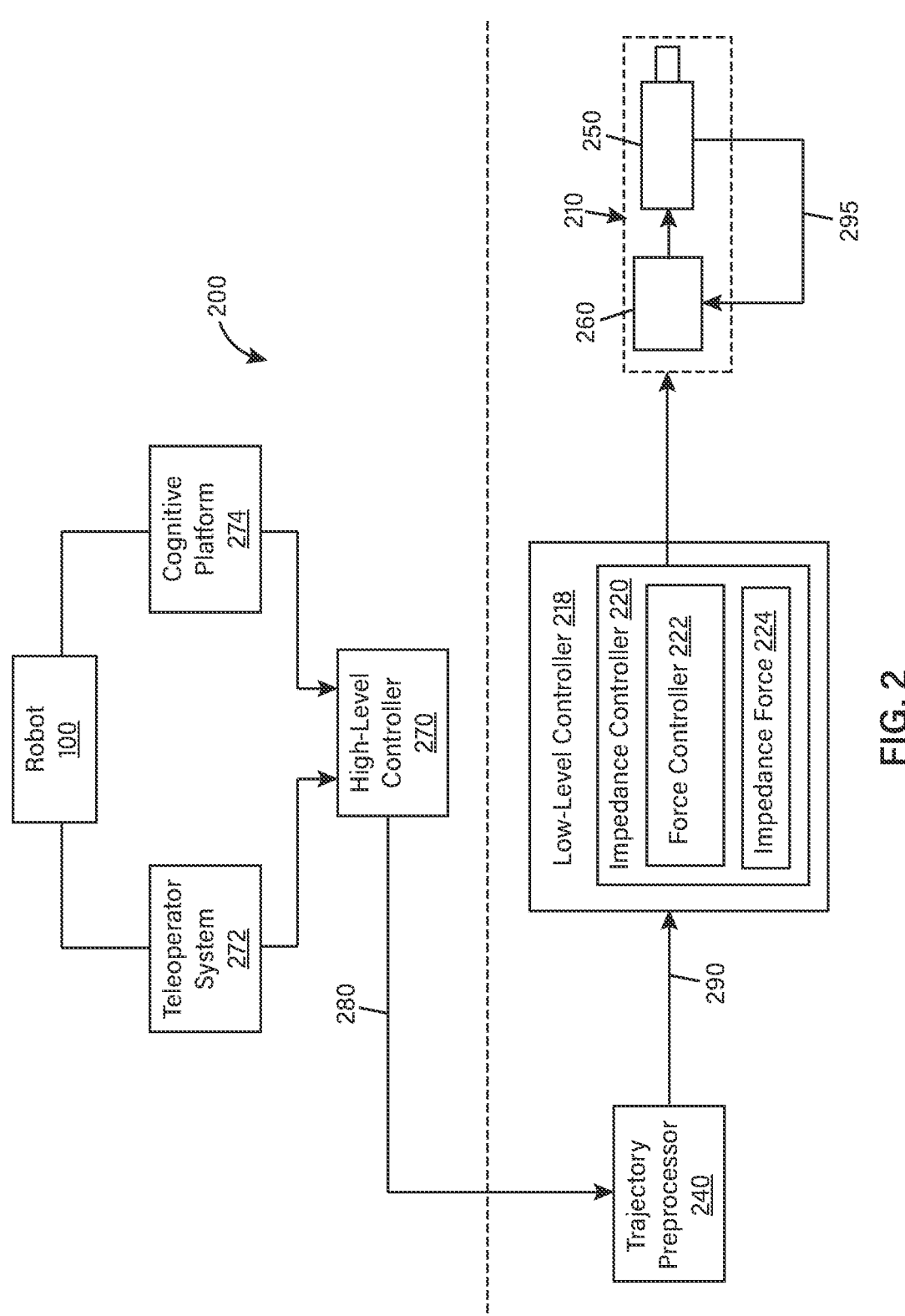
FIG. 2 is a block diagram of an example robotic joint actuation system.

FIG. 2 is a block diagram of an example system 200 for actuating a robotic joint. The system 200 includes an actuator 210, which can include a motor 250 and a motor driver 260 that provides current to the motor 250. The actuator 210 can be a linear or rotary actuator. The motor 250 can be coupled to a driven element of the actuator (e.g., a shaft or piston). The system 200 can include a low-level controller 218 that provides controls to the motor driver 260. In some examples, the low-level controller 218 can include an impedance controller 220. The system 200 can include a high-level controller 270 (e.g., a controller that controls a robot body) that generates reference trajectories for operation of the actuator 210 (the controller 270 is higher level in that it does not directly drive the actuator 210). In examples herein, the system 200 includes a trajectory preprocessor 240 that receives original reference trajectories from the high-level controller 270 and outputs feasible reference trajectories to the low-level controller 218.

In one example, the high-level controller 270 can receive joint trajectories (e.g., joint position, joint velocity, and joint force) from a teleoperator system 272 or a cognitive platform 274 associated with a robot (e.g., the robot 100 illustrated in FIG. 1). In some examples, movement of a pilot via the teleoperator system 272 can generate the joint trajectories. In other examples, the cognitive platform 274 can generate the joint trajectories based on a task to be performed by the robot. The high-level controller 270 can generate an original reference trajectory 280 for the actuator 210 based on the joint trajectories. Herein, a "reference trajectory" is a series of temporally-spaced reference positions. Each reference position in the reference trajectory specifies a desired position of the actuator 210 at a particular time. (In the case of rotary actuators, the reference positions are angular positions about a rotational axis of the actuator.) In some examples, the high-level controller 270 outputs the original reference trajectory 280 as a signal encoded with the reference positions (or as a signal that varies with time). The trajectory preprocessor 240 can receive the reference positions by sampling the output signal (also referred to herein as original reference trajectory signal) from the high-level controller 270.

In some examples, a maximum velocity and a maximum acceleration can be specified for operation of the actuator 210. The maximum velocity and acceleration can be based primarily on the capabilities of the actuator 210. The maximum velocity can be additionally influenced by loads acting on the actuator 210. For example, the maximum velocity of an actuator while operating under a relatively high load (such as in a shoulder joint) will be lower than the maximum velocity of the same actuator while operating under a relatively low load (such as in an elbow joint). In some examples, a maximum jerk can be specified for operation of the actuator 210. Jerk is related to the smoothness of the output motion of the actuator. In examples where the low-level controller 218 includes an impedance controller 220, the maximum jerk is based primarily on the characteristics of the impedance controller 220 (e.g., on the rise time of a force (or torque) controller 222 inside the impedance controller 220).

In some examples, the original reference trajectory 280 outputted by the high-level controller 270 may be unfeasible (e.g., may violate one or more of the maximum velocity, maximum acceleration, and maximum jerk specified for operation of the actuator). In examples herein, the trajectory preprocessor 240 can receive the original reference trajectory 280 (e.g., by sampling a signal outputted by the high-level controller 270 at a sampling rate (or sample rate), which can be based on the temporal spacing between the positions in the original reference trajectory 280) and output a feasible smooth reference trajectory 290. Herein, a "feasible smooth reference trajectory" is a reference trajectory that is continuous up to at least the third derivative and does not violate any of the maximum velocity and maximum acceleration specified for the actuator.

The low-level controller 218 can receive the feasible smooth reference trajectory 290 (e.g., by sampling an output signal from the trajectory preprocessor 240) and can provide controls (e.g., force or position) to the motor driver 260 based on the smooth reference trajectory 290. In some examples, an impedance controller 220 in the low-level controller 218 provides the controls to the motor driver 260. Impedance control relates to control of the contact forces between the end-effector of a robot and the environment. Impedance control models the relationship between force and velocity of the robot using a mass-spring-damper system. By defining the stiffness and damping of the system, the impedance (force and velocity) of the robot can be controlled. The impedance controller 220 can include an impedance force sub-block 224 that creates reference forces for the force controller 220 based on the smooth reference trajectory 290 and impedance behavior of the robot. The force controller 222 attempts to generate controls that achieve the desired force (or torque).

The motor driver 260 provides current to the motor 250 according to the controls received from the impedance controller 220. The motor driver 260 can receive measurements of force or position of the motor 250 (e.g., from one or more encoders coupled to the output of the motor 250) as feedback 295 and adjust the current to the motor 250 based on the feedback 295. While the motor 250 can be controlled via position or force, control of the actuator 210 based on force may offer a safer operation of the robot since the force provided by the impedance controller 220 is based on motion dynamics in the joint space of the robot.

The controllers 220, 270 and trajectory preprocessor 240 can be implemented in any combination of hardware, software, or firmware. Each of the controllers 220, 270 can include at least one processor, which can be any logic processing unit, including, for example, one or more central processing units digital signal processors, and/or application-specific integrated circuits.

Example IV—Example Trajectory Preprocessor

Figure 3:
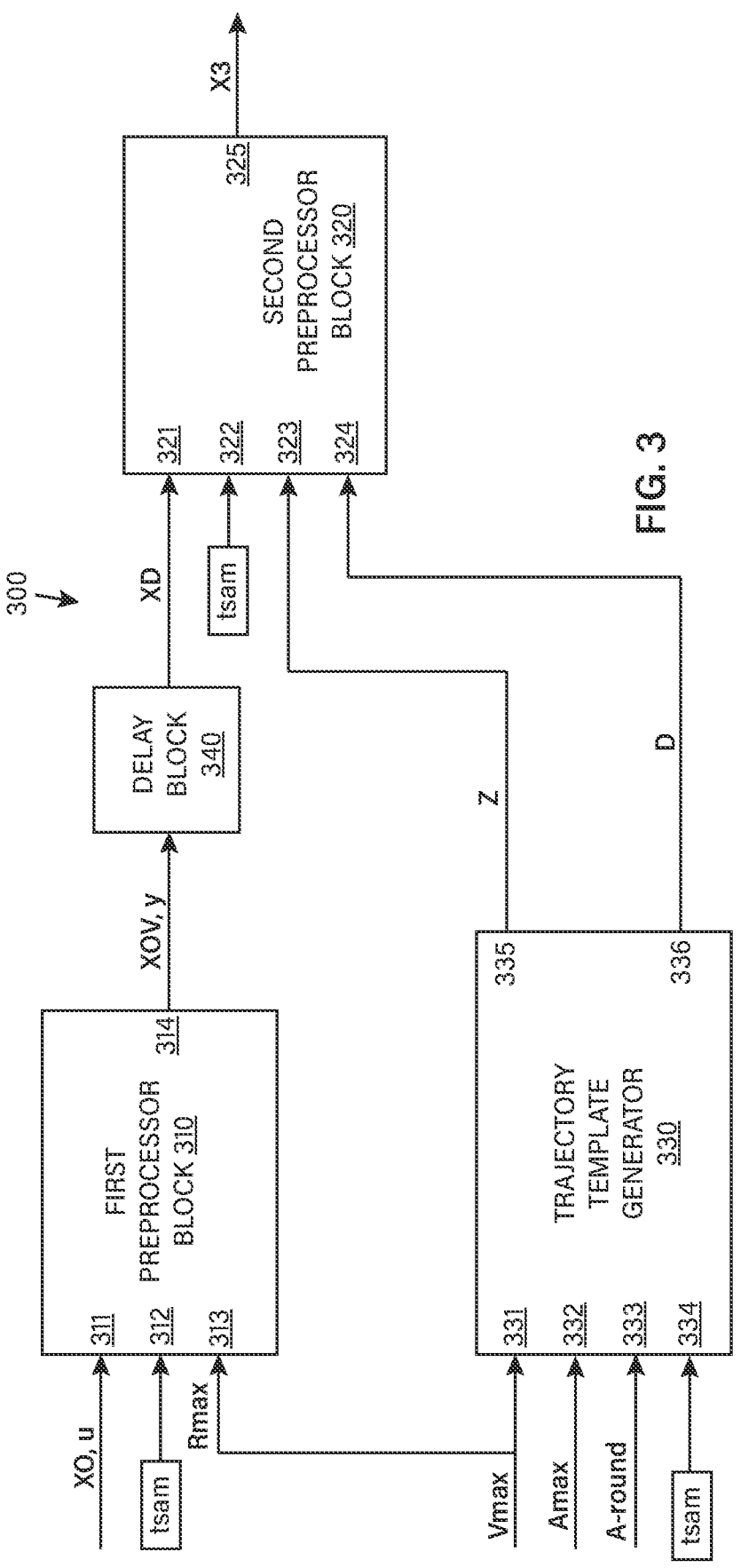
FIG. 3 is a block diagram of an example trajectory preprocessor.

FIG. 3 illustrates a block diagram of an example trajectory preprocessor 300, which can be an implementation of the trajectory preprocessor 240 in FIG. 2 (see Example III). Given an original reference trajectory for an actuator communicatively coupled to the trajectory preprocessor 300 (e.g., through a low-level controller 218 as shown in FIG. 2), the trajectory preprocessor 300 can generate a feasible smooth reference trajectory to control the positions of the actuator. The feasible smooth reference trajectory is a reference trajectory (e.g., includes temporally-spaced reference positions) that is continuous up to at least the third derivative (e.g., jerk is defined) and does not violate any of the maximum velocity and maximum acceleration specified for the actuator.

The trajectory preprocessor 300 can include a first preprocessor block 310 that enforces a maximum velocity on a given reference trajectory. In some examples, the first preprocessor block 310 samples an original reference trajectory XO on a first input node 311 at a sampling time $t_{sam}$ specified on a second input node 312. The first processor block 310 also receives a value for maximum velocity $V_{max}$ on a third input node 313. The first preprocessor block 310 generates a velocity-constrained reference trajectory XOV that respects the specified maximum velocity $V_{max}$ (see Example V), which means that there are no jumps or step functions in the velocity-constrained reference trajectory XOV that can result in infinite velocity and that there are no slopes in the velocity-constrained reference trajectory XOV with a value exceeding $V_{max}$. In one example, the first preprocessor block 310 generates the velocity-constrained reference trajectory XOV by replacing any step function or sudden changes in a copy of the original reference trajectory XO with a ramp having a slope equal to $V_{max}$. The first preprocessor block 310 can output the velocity-constrained reference trajectory XOV on an output node 314.

Although the velocity-constrained reference trajectory XOV does not violate the maximum velocity $V_{max}$ constraint specified for the actuator, it may violate other constraints specified for the actuator. For example, the velocity-constrained reference trajectory XOV may have sharp corners that can produce infinite acceleration. The acceleration profile of the velocity-constrained reference trajectory XOV may have discontinuities that produce large or infinite jerk. In the example, the trajectory preprocessor 300 includes a second preprocessor block 320 that takes a reference trajectory as input and smooths sharp corners in the reference trajectory while enforcing the maximum acceleration on the reference trajectory. The reference trajectory received as input in the second preprocessor block 320 can be a velocity-constrained reference trajectory so that the second preprocessor block 320 can output a reference trajectory that is smooth and does not violate the maximum velocity and acceleration constraints specified for the actuator (i.e., a feasible smooth reference trajectory).

FIG. 3 illustrates a delay block 340 between the first processor block 310 and the second preprocessor block 320. The delay block 340 is used to create a delayed trajectory XD that is received as an input of the second preprocessor block 320. For each delay, the delay block 340 can sample the output of the first processor block 310 and output the delayed versions of the output as the delayed trajectory XD. The second preprocessor block 320 uses the delayed trajectory XD to prepare trajectory plans (see Example VIII).

In one example, the second preprocessor block 320 can receive the delayed trajectory XD on a first input node 321, a sampling time $t_{sam}$ on a second input node 322, a master trajectory template Z on a third input node 324, and a delay D on a fourth input node 325. The delay D is based on the maximum velocity and maximum acceleration prescribed for the actuator (see Equations (5) and (6) in Example VI). Alternatively, the second preprocessor block 320 can receive the maximum velocity $V_{max}$ and the maximum acceleration $A_{max}$ and determine the delay D. The second preprocessor block 320 can use the delay D received at the input node 324 to determine the portion of the delayed trajectory XD to use in a trajectory plan. In some examples, after the second preprocessor block 320 receives a delayed trajectory XD from the delay block 340, the second preprocessor block 320 prepares a new trajectory plan based on the delayed trajectory and a previous trajectory plan. The second preprocessor block 320 can output a position from the new trajectory plan as the next position for the feasible smooth reference trajectory (see Example VIII).

In some examples, the trajectory preprocessor 330 can include a trajectory template generator 330 that provides the master trajectory template Z and the delay D to the second preprocessing block 320. In some examples, the trajectory template generator 330 can receive the maximum velocity $V_{max}$ on an input node 331, the maximum acceleration $A_{max}$ on an input node 332, an acceleration factor A-round on an input node 333, and a sampling time $t_{sam}$ on an input node 334. In some examples, the trajectory preprocessor 300 can compute the master trajectory template Z by sequentially integrating a predefined jerk profile three times (see Example VII). Thus, the resulting trajectory template Z is continuous (smooth) up to at least the third derivative, avoiding infinite acceleration and jerk.

The trajectory preprocessor 300 can use $V_{max}$, $A_{max}$, and A-round to constrain the master trajectory template Z. The acceleration factor A-round is a ratio of a time duration (or length) of a non-zero-jerk segment to a time duration (or length) of a zero-jerk segment in the jerk profile (see Example VI) and its value affects the shape of the jerk profile. The predefined jerk profile can be adjusted to comply with A-round and then integrated to obtain the initial trajectory template Z. The length (measured in time) of the trajectory template Z can be adjusted based on the delay D, which is determined based on $V_{max}$ and $A_{max}$ (see Equations (5) and (6) in Example VI), which results in a trajectory template Z that will enforce the maximum acceleration prescribed for the actuator. In some examples, the length of the trajectory template Z is twice the delay D. The trajectory template generator 330 can output the delay D on an output node 336 and the master trajectory template Z on an output node 335.

The trajectory preprocessor 300 can be implemented in any combination of hardware, software, or firmware. In some examples, the trajectory preprocessor 300 can be implemented as a program executed by a processor (e.g., a digital signal processor, a programmable logic device, an application-specific integrated circuit, or other appropriate processing hardware). The trajectory preprocessor 300 can be stored in one or more non-transitory computer-readable storage media or computer-readable storage devices and executed by one or more processor units. The trajectory preprocessor 300 can be generic to the specifics of operating systems or hardware and can be applied in any variety of environments to take advantage of the described features. In some examples, the trajectory preprocessor 300 can be integrated with a low-level controller (e.g., the low-level controller 218 in FIG. 2).

Example V—Example Velocity-Constrained Reference Trajectory Generation

Figure 4A:
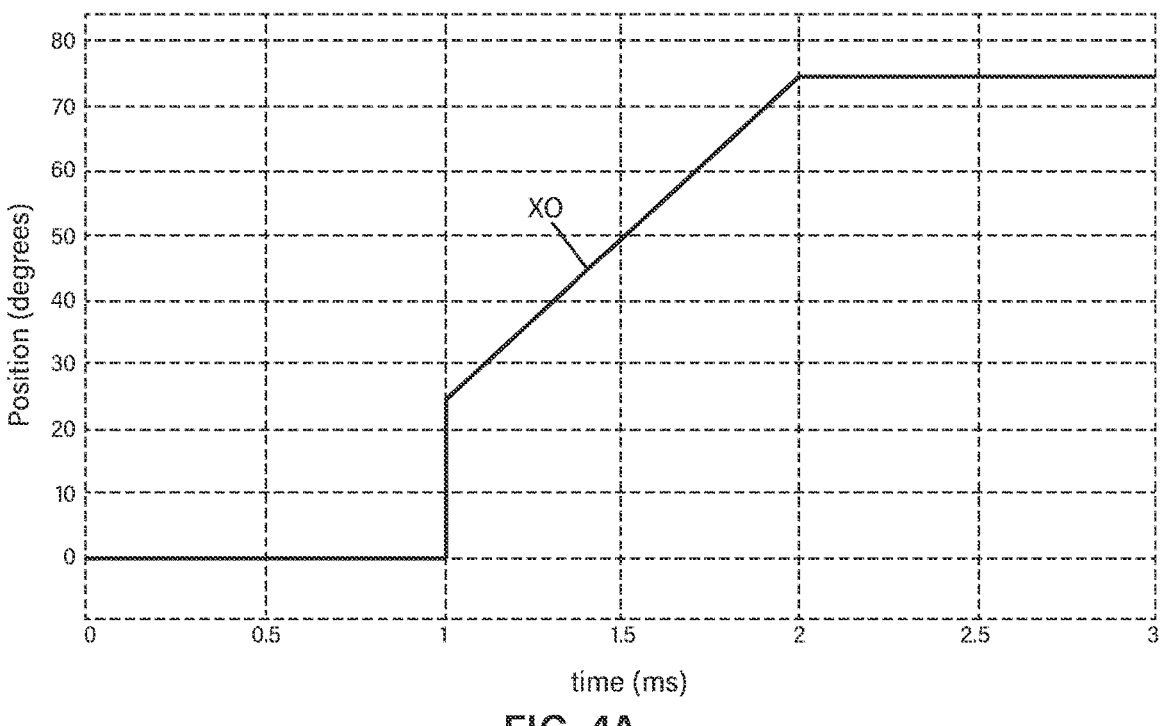
FIG. 4A is a graph of a hypothetical reference trajectory.

Consider the hypothetical original reference trajectory XO shown in FIG. 4A for a hypothetical robotic joint RJ actuated by a hypothetical actuator AC. The reference trajectory XO includes a series of temporally-spaced reference positions. In the example, at time t=1 millisecond (ms), the reference trajectory XO prescribes an instantaneous jump from 0 degrees to 25 degrees, requiring infinite velocity, which is not feasible for the actuator AC given that the actuator AC has a maximum velocity that it can provide. In general, any steep motion on the trajectory with a slope that is greater than the maximum velocity of the actuator at the loading conditions of the actuator would be unfeasible.

The first preprocessor block 310 (see Example IV and FIG. 3) can receive an original reference trajectory (such as the hypothetical original reference trajectory XO) and generate a velocity-constrained reference trajectory that respects a maximum velocity specified for a given actuator. In some examples, the first preprocessor block 310 can generate the velocity-constrained reference trajectory by replacing any step functions or sudden changes in a copy of the original reference trajectory with a ramp having a prescribed rate, which can be the maximum velocity specified for the given actuator. Where the first preprocessor block 310 is receiving the original reference trajectory one reference position at a time, the velocity-constrained reference trajectory is also generated one reference position at a time.

Figure 5:
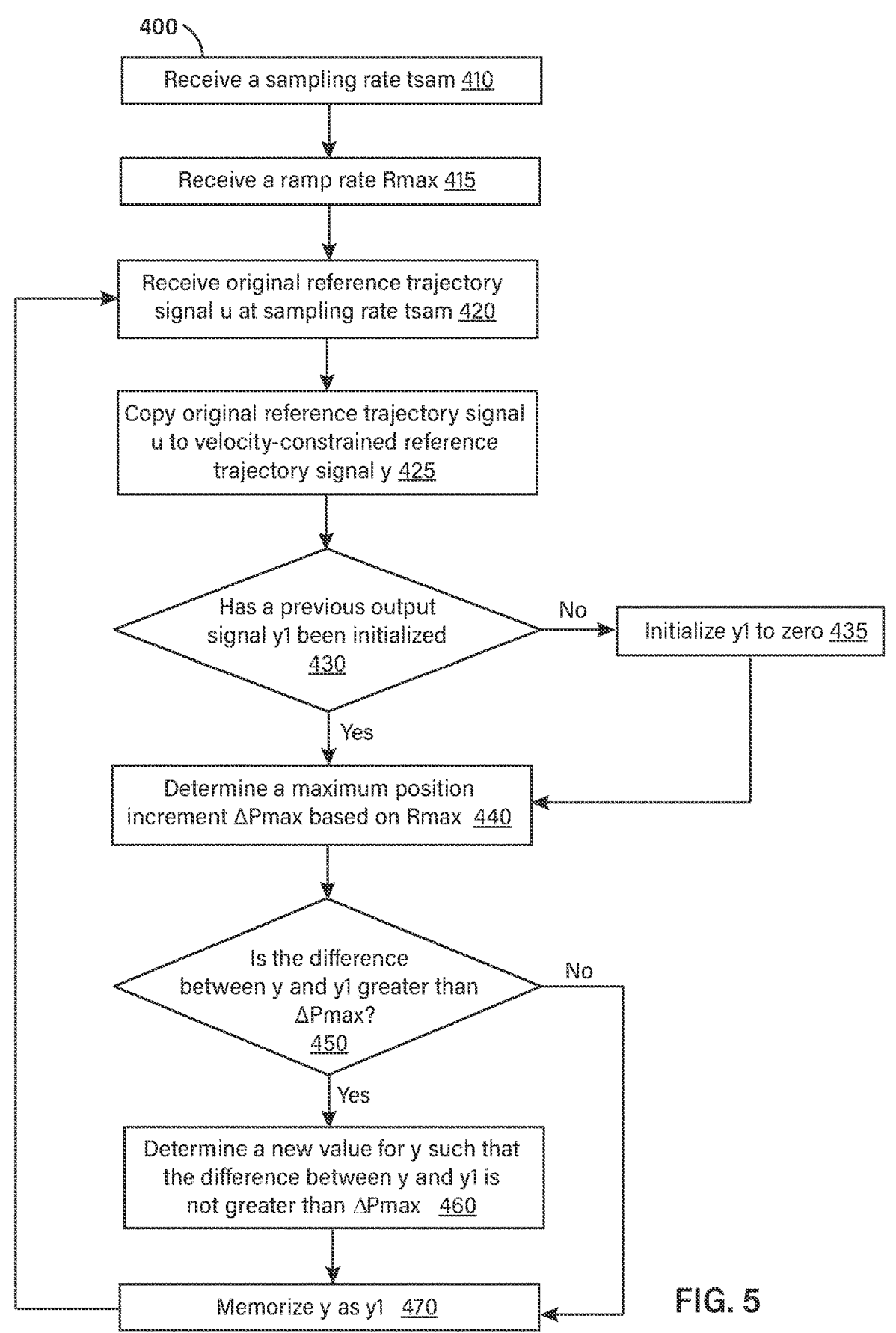
FIG. 5 is a flowchart illustrating a method of generating a velocity-constrained reference trajectory.

FIG. 5 is a flowchart illustrating a method 400 of generating a velocity-constrained reference trajectory. The method 400 can be performed by the first preprocessor block 310 (see FIG. 3 and Example IV). The operations of the method 400 are illustrated in a particular order in FIG. 5, but the operations may be reordered and/or repeated and/or performed in parallel and/or replaced with equivalent operations as desired and appropriate.

At 410, the method 400 can include receiving or accessing a sampling rate $t_{sam}$ (e.g., at the input node 312 of the first preprocessing block 310 shown in FIG. 3).

At 415, the method 400 can include receiving or accessing a ramp rate $R_{max}$ (e.g., at the input node 313 of the first preprocessing block 310). In some examples, the ramp rate $R_{max}$ can be a maximum velocity $V_{max}$ for a given actuator.

At 420, the method 400 can include receiving or accessing an original reference trajectory signal u (e.g., at an input node 311 of the first preprocessing block 310). For example, the first preprocessing block 310 can sample the original reference trajectory signal u at the sampling rate $t_{sam}$. Each sample of the original reference trajectory signal u can contain a position in the original reference trajectory at the sampling time.

At 425, the method 400 can include copying (or mirroring) the original reference trajectory signal u to a velocity-constrained reference trajectory signal y (which is outputted at the output node 314 of the first preprocessing block 310).

At 430, the method 400 can determine if a previous output signal $y_1$ has been initialized (or holds a memorized value). If the previous output signal $y_1$ has not been initialized, the method 400 can initialize the previous output signal $y_1$ to zero, as shown at 435. The method 400 uses the previous output signal $y_1$ to hold a copy of the velocity-constrained reference trajectory signal y at a previous time step, as shown in operation 470.

At 440, the method 400 can include determining a maximum position increment $\Delta P_{max}$ to meet the ramp rate $R_{max}$. The maximum position increment $\Delta P_{max}$ can be determined by Equation (1).

$$\Delta P_{max} = R_{max} \times t_{sam} \qquad (1)$$

At 450, the method 400 can include determining whether the initial value of the velocity-constrained reference trajectory signal y respects the ramp rate $R_{max}$ (which is the same as determining whether the value of the slope at the current position of the original reference trajectory signal u exceeds $R_{max}$). In one example, the method can determine whether the Inequality (2) is true or false.

$$|y - y_1| > \Delta P_{max} \qquad (2)$$

If the Inequality (2) is false, then the initial value of the velocity-constrained reference trajectory signal y respects the maximum rate $R_{max}$. In this case, the method continues to operation 470.

If the inequality (2) is true, then the initial value of the velocity-constrained reference trajectory signal y does not respect the maximum rate $R_{max}$. In this case, at 460, a new value is determined for the velocity-constrained reference trajectory signal y. In one example, a new value can be determined according to Equation (3).

$$y = y_1 + ((y - y_1) * \Delta P_{max}) \qquad (3)$$

Equation (3) would have the effect of replacing any step function or sudden changes in a copy of the original reference trajectory u with a ramp having a ramp rate $R_{max}$. If $R_{max}$ is set to the maximum velocity $V_{max}$ of the actuator, then the velocity-constrained trajectory signal y will respect $V_{max}$. After determining a new value for the velocity-constrained reference trajectory signal y, the method 400 continues to operation 470.

At 470, the method 400 includes memorizing the velocity-constrained trajectory signal y (or the current value of the velocity-constrained trajectory signal y) as the previous output signal $y_1$ (or the previous value of the velocity constrained trajectory signal) for the next time step. The current value of the velocity-constrained trajectory signal y can be sampled at the output node 314 of the first preprocessing block 310. After operation 470, the method 400 can return to operation 420 to process another sample of the original reference trajectory signal u.

Figure 4B:
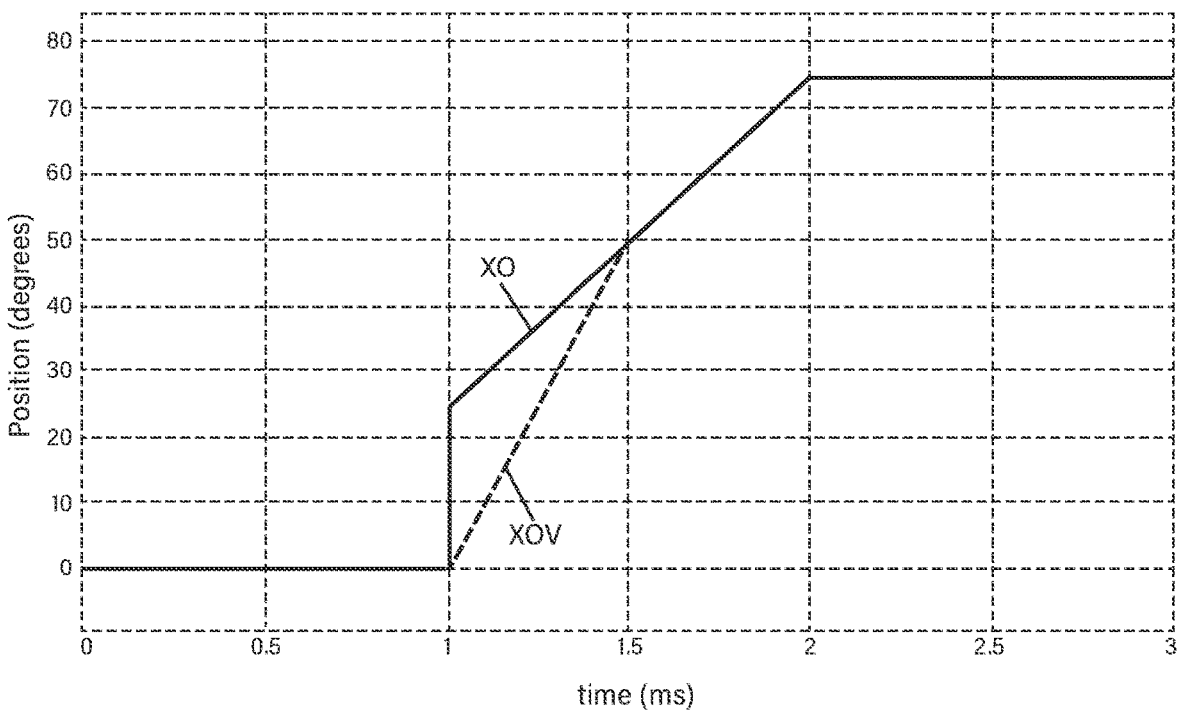
FIG. 4B is a graph of a hypothetical reference trajectory and a velocity-constrained reference trajectory.
Figure 4C:
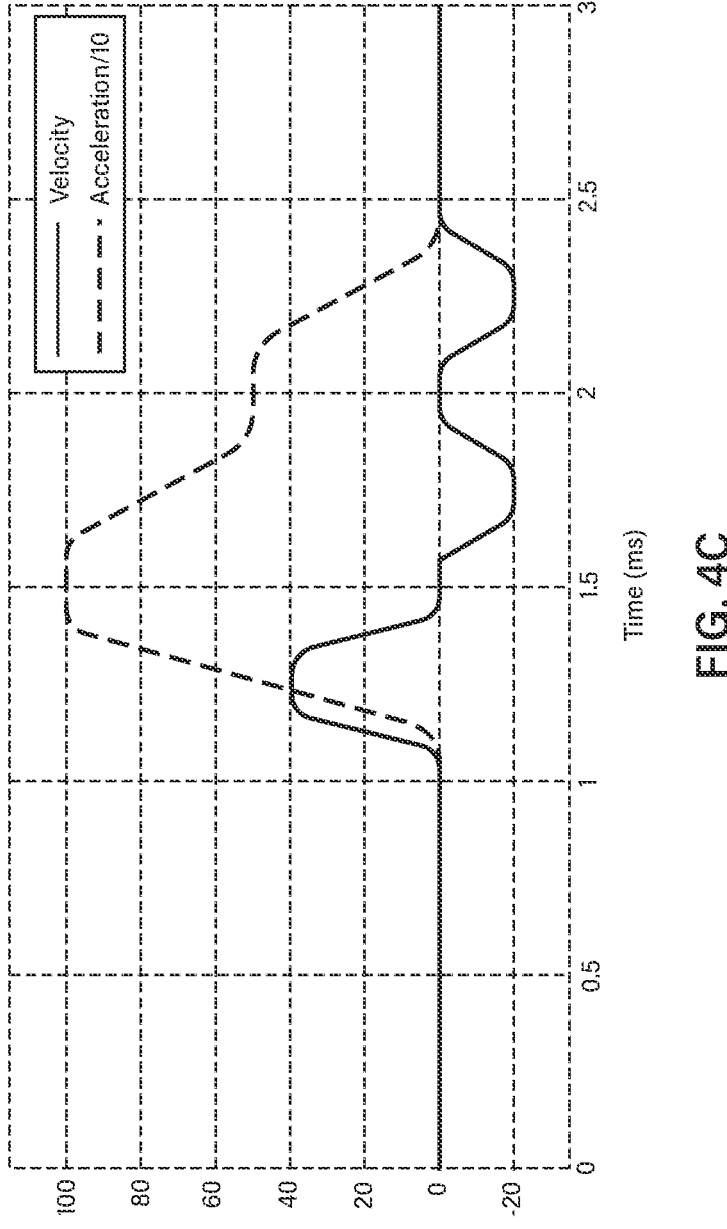
FIG. 4C is a graph of velocity and acceleration profiles for the velocity-constrained reference trajectory shown in FIG. 4B.

FIG. 4B shows a velocity-constrained reference trajectory XOV that can be outputted by the first preprocessor block 310 based on the hypothetical original reference trajectory XO shown in FIG. 4A. As can be observed, the velocity-constrained reference trajectory $X_1$ includes a ramp with a ramp rate of $V_{max}$ starting at 1 millisecond instead of the step function at 1 millisecond in the hypothetical original reference trajectory XO. Desirably, the velocity profile of the velocity-constrained reference trajectory XOV is bounded and is constrained by the maximum velocity $V_{max}$ prescribed for the actuator. FIG. 4C shows a velocity profile and acceleration profile for the velocity-constrained reference trajectory XOV.

Example VI—Example Delayed Trajectory Generation

To smooth a sharp corner in a reference trajectory, future knowledge of the sharp corner is needed to prepare for the smoothing. However, such future knowledge is not available when receiving the positions of a reference trajectory one at a time. To address this, the trajectory preprocessor 300 (see Example IV and FIG. 3) uses the delay block 340 to create an illusion of future knowledge of a given reference trajectory. The delay block 340 samples the velocity-constrained reference trajectory signal outputted by the first preprocessor block 310 (see Example V) a number of times corresponding to a desired delay and outputs all the delayed versions of the velocity-constrained reference trajectory signal. The output of the delay block 340, which is described herein as a delayed trajectory, includes a current value of the velocity-constrained reference trajectory signal and past values of the velocity-constrained reference trajectory.

The delay block 340 can be implemented using any suitable method. In one example, the delay block 340 can be implemented as a tapped delay or a First In, Last Out (FILO) buffer. An example of a suitable Tapped Delay block can be found in MathLab from MathWorks. The Tapped Delay block delays an input by a specified number of sample periods and outputs all the delayed versions. The Tapped Delay block receives one scalar input and generates an output vector (or array) that contains each delay. For example, if the number of delays (or the size of the delay) is specified as 4, the Tapped Delay block will generate an output vector that contains four delayed versions of the input signal (e.g., a first delayed version by 4 sample periods, a second delayed version by 3 sample periods, a third delayed version by 2 sample periods, and a fourth delayed version by 1 sample period).

Given a delay time d, the length L of the tapped delay array needed to hold the delayed versions of the input signal is given by Equation (4).

$$L = \frac{d}{t_{sam}} \qquad (4)$$

The optimum delay time D for future knowledge based on the constraints prescribed for the actuator is given by Equation (5), where $V_{max}$ is maximum velocity, $A_{max}$ is maximum acceleration, and $J_{max}$ is maximum jerk for the actuator.

$$D = \frac{1}{2}\left(\frac{V_{max}}{A_{max}} + \frac{A_{max}}{J_{max}}\right) \qquad (5)$$

For simplicity, it can be assumed that $V_{max}/A_{max}=A_{max}/J_{max}$. In this case, the optimum delay time $d_1$ can be expressed as:

$$D = \frac{V_{max}}{A_{max}} \qquad (6)$$

As can be observed, if the optimum delay time D in Equation (6) is substituted for the tapped delay time d in Equation (4), the length L of the tapped delay array will vary with $V_{max}$ and $A_{max}$, which may not be ideal from a programming standpoint. The maximum acceleration $A_{max}$ is always bigger than the maximum velocity $V_{max}$, which means that the optimum delay time D will always be less than 1 second. This can be exploited to provide a tapped delay array with a fixed length. For example, a fixed array length selected based on a fixed tapped delay time of 1 second would be sufficiently large to cover any $V_{max}$ and $A_{max}$ scenario.

Based on Equation (4), the length L of the tapped delay array based on a tapped delay time d of 1 second is $1/t_{sam}$ seconds. If $t_{sam}$ is 1 millisecond, for example, then the length L of the tapped delay array is 1,000 elements. As long as $t_{sam}$ is fixed at 1 millisecond, the length L of the tapped delay array will be fixed at 1,000 elements. If $V_{max}$ is 100 deg/s and $A_{max}$ is 500 deg/s², for example, then the optimum delay time D is 0.2 seconds (from Equation (6)), which is smaller than the fixed tapped delay time d of 1 second. This means that the tapped delay will have more delayed versions of the input signal (e.g., the velocity-constrained reference trajectory signal) than needed. In this case, the 200 most recent elements (corresponding to 0.2×1,000 elements) in the tapped delay array can be used for the future knowledge of the velocity-constrained reference trajectory signal.

Example VII—Example Trajectory Template
Generation

The trajectory template generator 330 (see Example IV and FIG. 3) generates a trajectory template from a predefined jerk profile. The trajectory template generator 330 computes the trajectory template by sequentially integrating the predefined jerk profile three times (e.g., integrating jerk to obtain change in acceleration, integrating acceleration to obtain change in velocity, and integrating velocity to obtain change in position).

Jerk is the time rate of change of acceleration. A non-zero-jerk over a time period means that acceleration is increasing or decreasing over the time period. A zero-jerk over a time period means that acceleration is constant over the time period. Rapid changes in acceleration are generally undesirable (e.g., rapid changes can cause vibrations in the system). A desirable jerk profile will avoid rapid changes in acceleration.

Figure 6A:
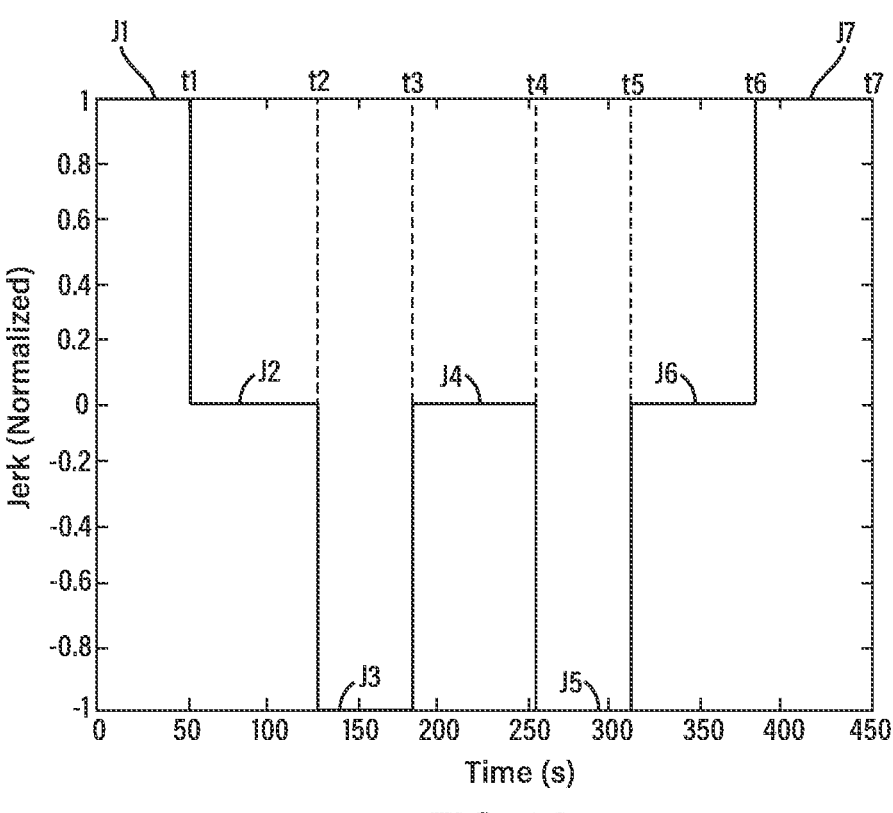
FIG. 6A is a graph illustrating an example normalized jerk profile with zero-jerk segments and non-zero-jerk segments having relatively equal time durations.

FIG. 6A shows an example jerk profile having a step profile. In the example, the step profile has seven segments $J_1$ to $J_7$. In other examples, the jerk profile could have fewer than or greater than seven segments. In the example shown in FIG. 6A, the jerk values have been normalized using a maximum jerk and run from −1 to 1. The segments $J_1$, $J_3$, $J_5$, and $J_7$ are non-zero-jerk segments (e.g., the segments $J_1$ and $J_7$ have a positive jerk of 1, and the segments $J_{13}$, $J_{15}$ have a negative jerk of −1). The segments $J_2$, $J_4$, and $J_6$ are zero-jerk segments (with jerk value of 0). Zero-jerk means constant acceleration. In the example shown in FIG. 6A, jerk is positive for a time from 0 to $t_1$, zero for a time from $t_1$ to $t_2$, negative for a time from $t_2$ to $t_3$, zero for a time from $t_3$ to $t_4$, negative for a time from $t_4$ to $t_5$, zero for a time from $t_5$ to $t_6$, and positive for a time from $t_6$ to $t_7$.

Figure 6B:
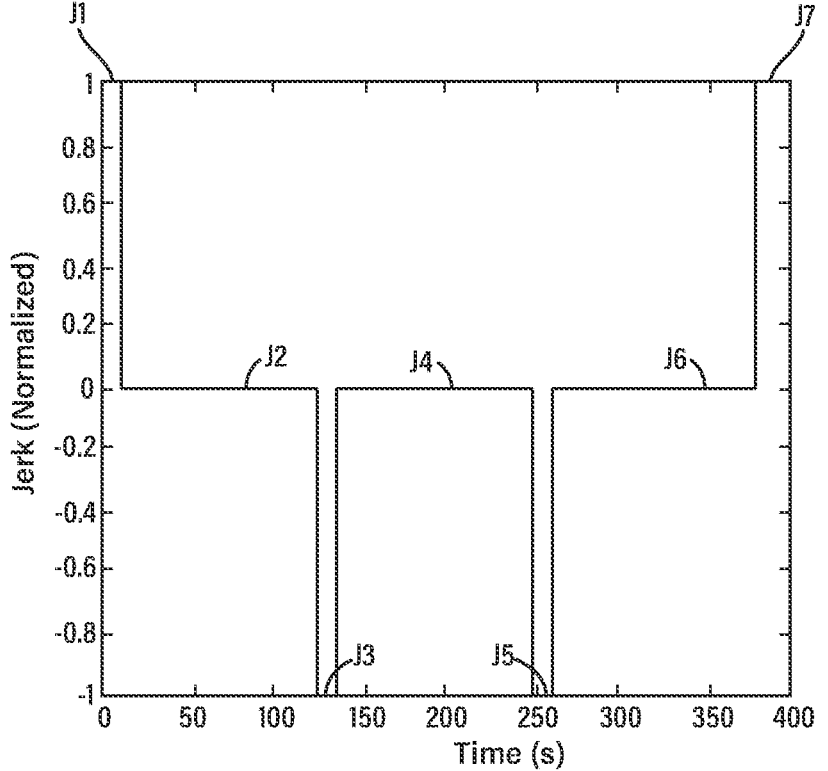
FIG. 6B is a graph illustrating an example normalized jerk profile with zero-jerk segments lasting for longer time durations compared to non-zero-jerk segments.
Figure 6C:
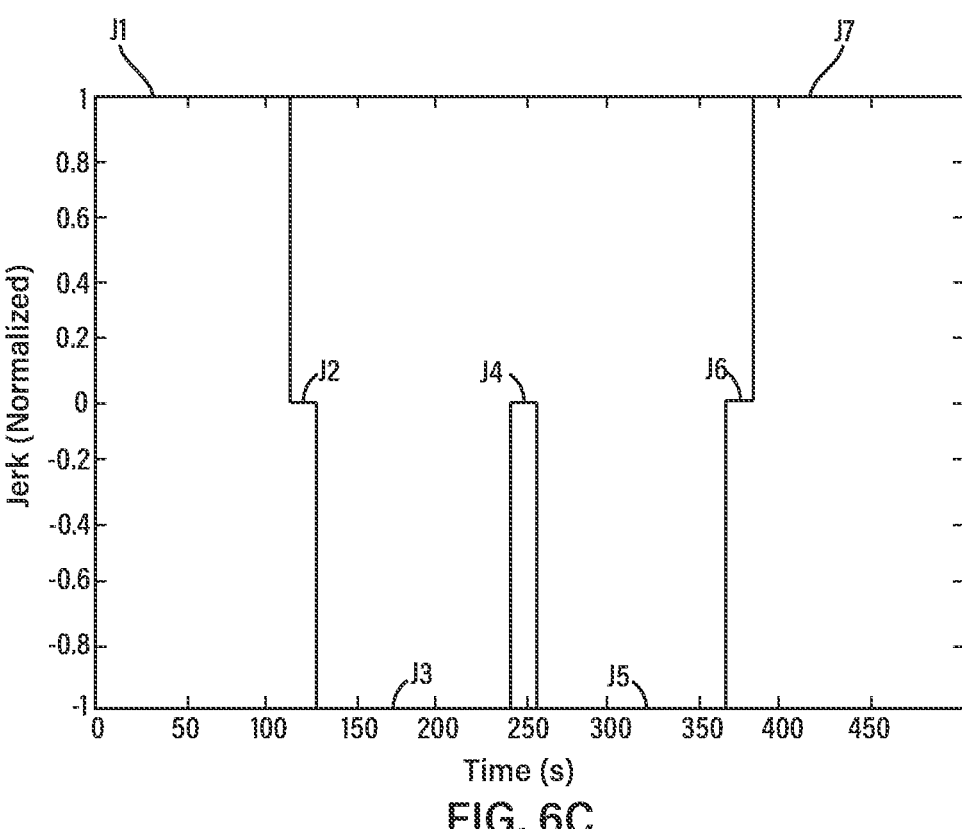
FIG. 6C is a graph illustrating an example normalized jerk profile with zero-jerk segments lasting for shorter time durations compared to non-zero-jerk segments.

In the example shown in FIG. 6A, the jerk segments are roughly equally divided over time, which means roughly equal periods of constant acceleration and increasing or decreasing acceleration. In other examples, the non-zero-jerk segments and zero-jerk segments can have different durations. FIG. 6B shows an example where the non-zero-jerk segments $J_1$, $J_3$, $J_5$, and $J_7$ last for shorter durations compared to the zero-jerk segments $J_2$, $J_4$, $J_6$. FIG. 6C shows an example where the non-zero-jerk segments last for longer durations compared to the zero-jerk segments.

Figure 7:
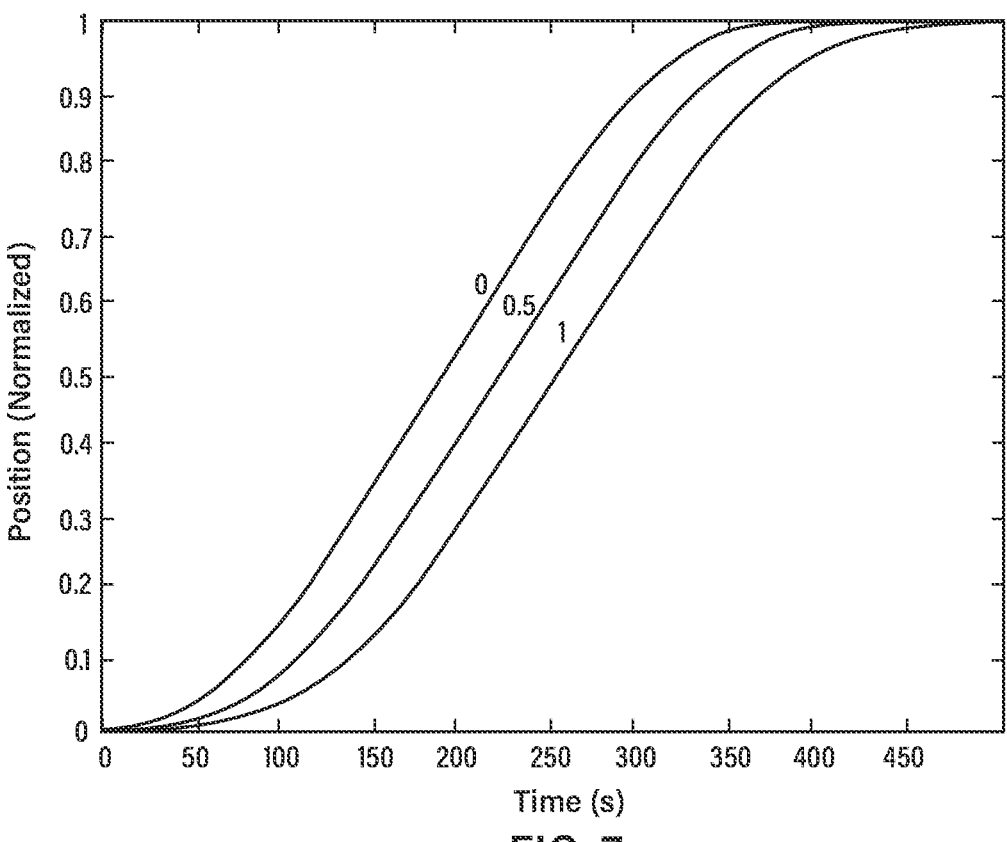
FIG. 7 is a graph illustrating a comparison of trajectory templates with different ratios of non-zero-jerk segment length to zero-jerk segment length.

The relative lengths of the non-zero-jerk segments and zero-jerk segments have implications for shaping aggressiveness of the trajectory template. An acceleration factor A-round can be defined as a ratio of a duration (or length) of a non-zero-jerk segment to a duration (or length) of a zero-jerk segment. A-round determines how aggressive the trajectory template will be in smoothing a corner, with 0 being most aggressive (e.g., rounding a corner with constant acceleration) and 1 being least aggressive (e.g., rounding a corner with changing acceleration). FIG. 7 shows a comparison of three trajectory templates $XT_0$ (A-round=0), $XT_{0.5}$ (A-round=0.5), and $XT_1$ (A-round=1) with different A-round values. The delay time D needed for future knowledge and A-round are related. For example, A-round of 0 uses 25% less delay compared to A-round of 1.

The trajectory template generator 330 can receive maximum velocity $V_{max}$, maximum acceleration $A_{max}$, A-round, and sampling time $t_{sam}$ as inputs. The trajectory template generator 330 can have a predefined jerk profile, such as shown in any of FIGS. 6A-6C. Using A-round, the relative time lengths (or durations) of the zero and non-zero segments of the predefined jerk profile can be adjusted. The predefined jerk profile (as modified by A-round) can be integrated thrice to obtain a trajectory template Z having an initial length 1. The final length of the trajectory template Z can be set based on an optimum delay time D, which can be computed based on $A_{max}$ and $V_{max}$ (see Equation (6) in Example VI). In some examples, the length of the trajectory template Z is greater than the optimum delay time D (e.g., twice as long as the optimum delay time D). The trajectory template Z is constrained by $V_{max}$ and $A_{max}$. The maximum jerk associated with the trajectory template Z can be determined from Equation (5) in Example VI.

The trajectory template generator 330 can generate the trajectory template Z and store the trajectory template Z for use by the second preprocessing block 320. The trajectory template generator 330 can generate the trajectory template Z at start-up or after a reset or if the value of any of $V_{max}$, $A_{max}$, or A-round changes or periodically.

The trajectory template generator 330 can be implemented in any combination of hardware, software, or firmware. In some examples, the trajectory template generator can be implemented as a program executed by a controller (e.g., a microcontroller). The trajectory template generator can be stored in one or more computer-readable storage media or computer-readable storage devices and executed by one or more processor units. The trajectory template generator can be generic to the specifics of operating systems or hardware and can be applied in any variety of environments to take advantage of the described features.

Example VIII—Example Trajectory Smoothing

FIGS. 8A-8E illustrate trajectory smoothing using a master trajectory template (see Example VII) and delayed trajectories (see Example VI).

Figure 8A:
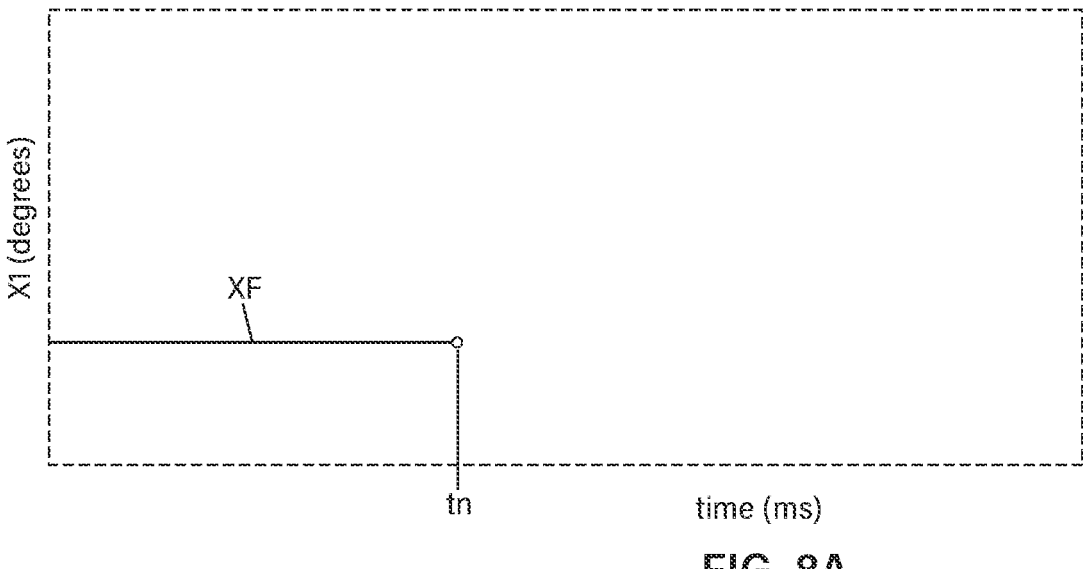
FIGS. 8A-8G illustrate trajectory smoothing using a master trajectory template.
Figure 8B:
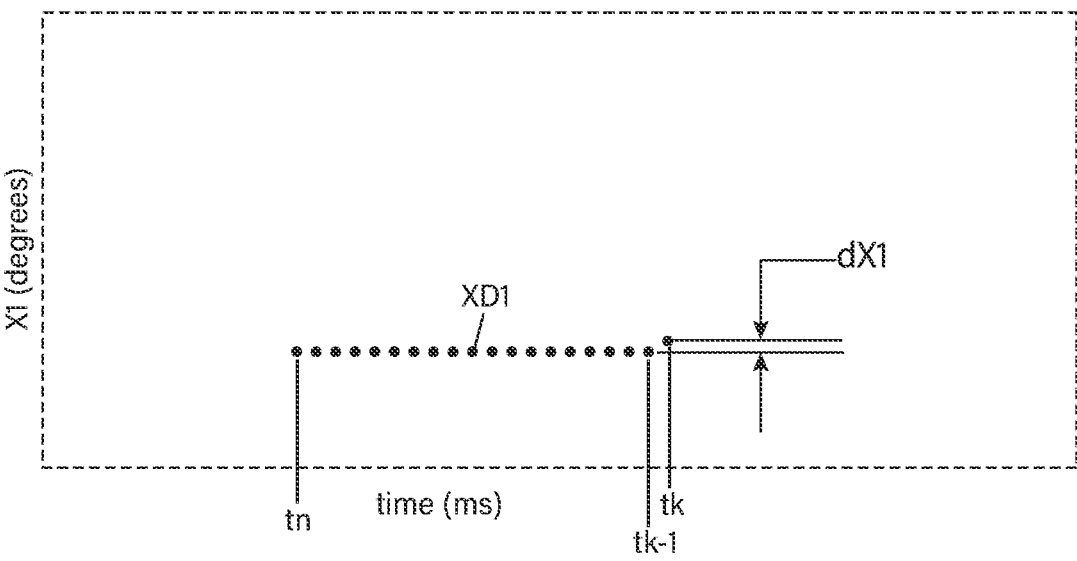

FIG. 8A shows that a smooth reference trajectory XF outputted from the second preprocessing block 320 (shown in FIG. 3) is now at time $t_n$. FIG. 8B shows a delayed trajectory $XD_1$ outputted by the delay block 340 (shown in FIG. 3) at the current time $t_n$. The delayed trajectory extends from $t_n$ to $t_k$ (the distance from $t_n$ to $t_k$ is determined by the optimum delay time D as described in Example VI). The positions in the delayed trajectory $XD_1$ can be spaced by a sampling rate $t_{sam}$ used in generating the delayed trajectory $XD_1$. The delayed trajectory $XD_1$ represents future knowledge that will be exploited in generation of trajectory plans. In the illustrated example, the first two positions of the delayed trajectory $XD_1$ at time $t_k$ and $t_{k-1}$ represent the most recent positions in the delayed trajectory $XD_1$ (e.g., the delayed positions in the delayed trajectory $XD_1$ with the least amount of delay time or the most recent samples taken by the delay block for the delay period). In the illustrated example, there is a jump in position from time $t_{k-1}$ to $t_k$ in the delayed trajectory $XD_1$. For example, $dX_1 = XD_1(t_k) - XD_1(t_{k-1}) > 0$. The jump $dX_1 > 0$ can indicate the beginning of a sharp corner or could be noise.

Figure 8C:
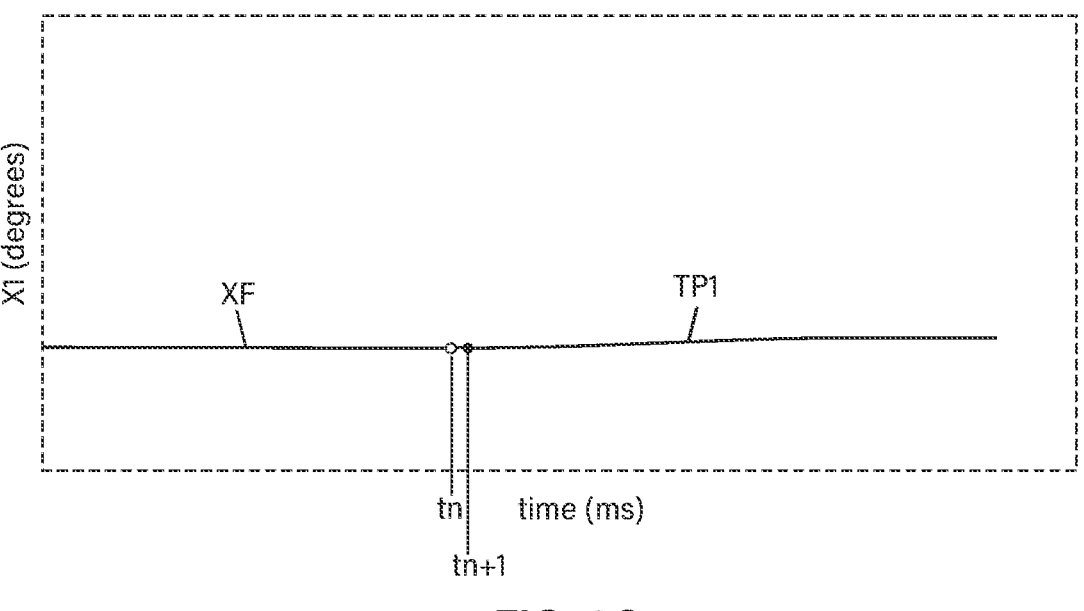
Figure 9:
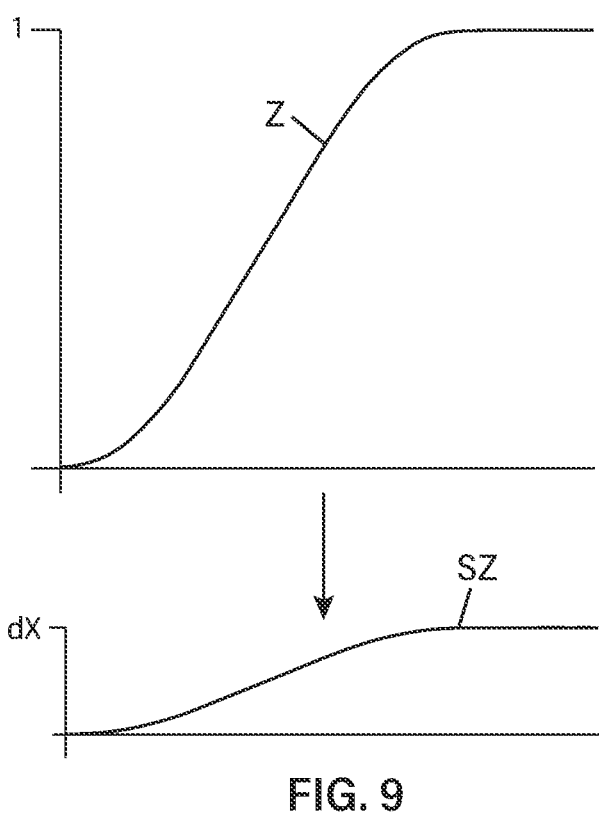
FIG. 9 illustrates scaling of a master trajectory template.

Upon detecting the jump $dX_1 > 0$ between the two most recent positions of the delayed trajectory $XD_1$, a first scaled trajectory template $SZ_1$ can be created using the master trajectory template. The first scaled trajectory template $SZ_1$ can be created by copying the master trajectory template and scaling the copy of the master trajectory template by dx. FIG. 9 illustrates this scaling. The master trajectory template Z (which is normalized) has a height of 1, while the scaled version SZ of the trajectory template has a height of dX (only the height of the master trajectory template copy is scaled by dX). A first trajectory plan $TP_1$ is generated by adding the first scaled trajectory template $SZ_1$ to a previous trajectory plan (which in this initial example is the delayed trajectory $XD_1$), as shown in FIG. 8B. The first value of the first trajectory plan provides the next value at time $t_{n+1}$ for the smooth reference trajectory XF, as shown in FIG. 8C.

Figure 8D:
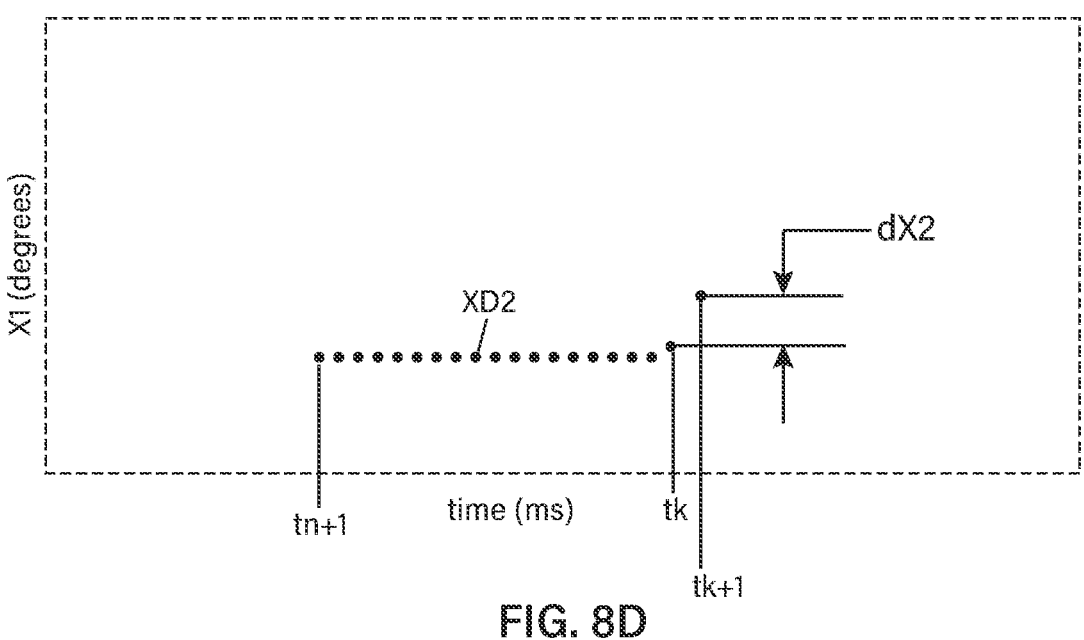
Figure 8E:
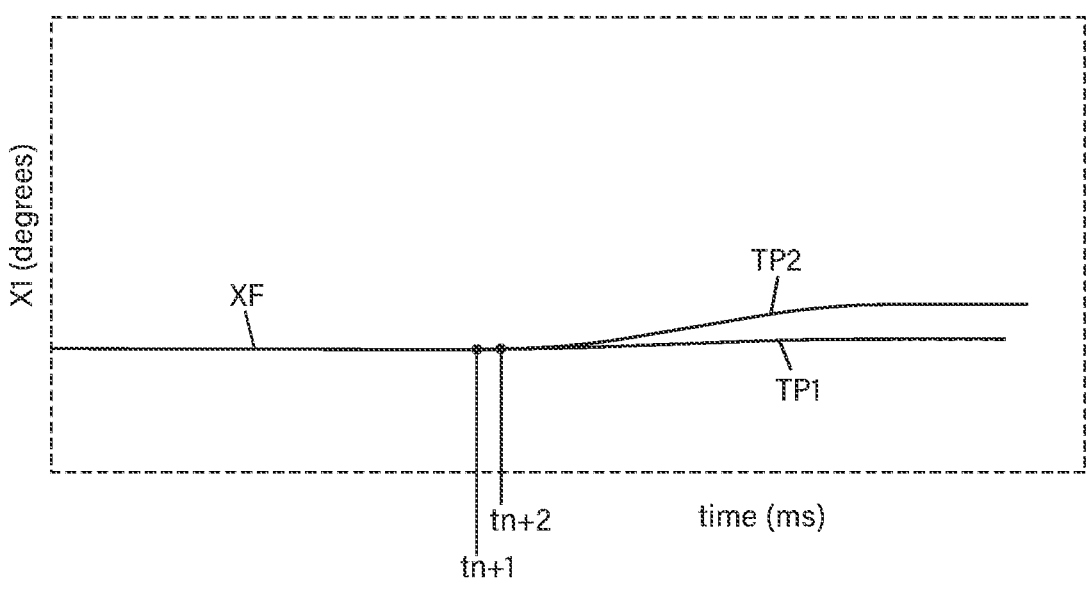

Assume that the smooth reference trajectory XF is now at time $t_{n+1}$. Further assume that the delay block 340 has outputted a new delayed trajectory $XD_2$ (shown in FIG. 8D) that now extends from $t_{n+1}$ to $t_{k+1}$. Assume that the delayed trajectory $XD_2$ indicates another jump in position at $t_{k+1}$ as shown in FIG. 8D, that is, $dX_2=XD_2(t_{k+1})-XD_2(tk)>0$. Upon detecting $dX_2>0$, a second scaled trajectory template $SZ_2$ can be created by copying the master trajectory template Z and scaling the copy of the master trajectory template by $dX_2$. A second trajectory plan $TP_2$ is generated by adding the second scaled trajectory template $SZ_2$ to the first trajectory plan $TP_1$, as shown in FIG. 8E. The first value of the second trajectory plan $TP_2$ provides the next value for the smooth reference trajectory XF at $t_{n+2}$.

Figure 8F:
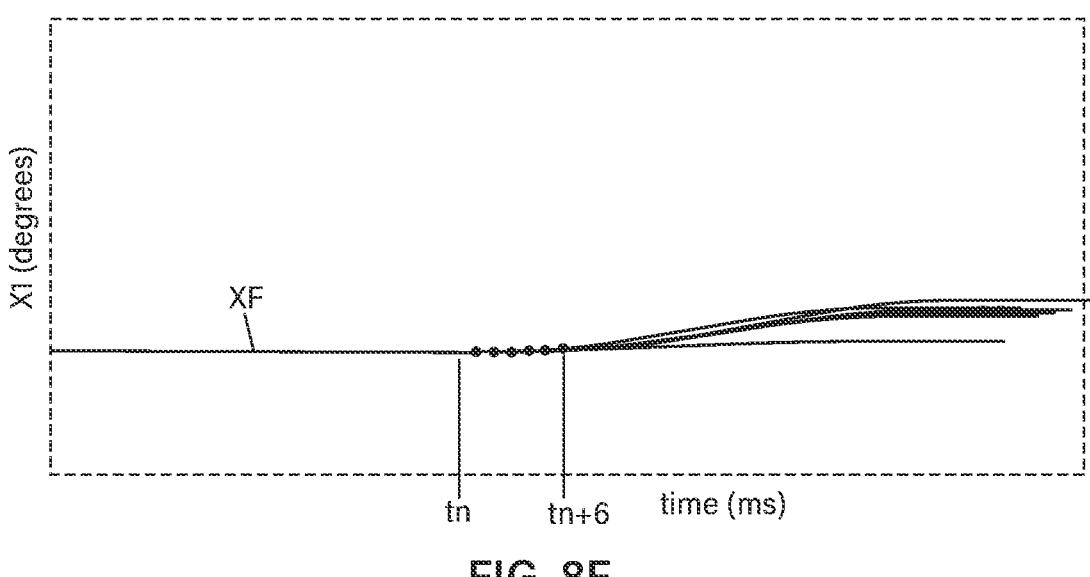
Figure 8G:
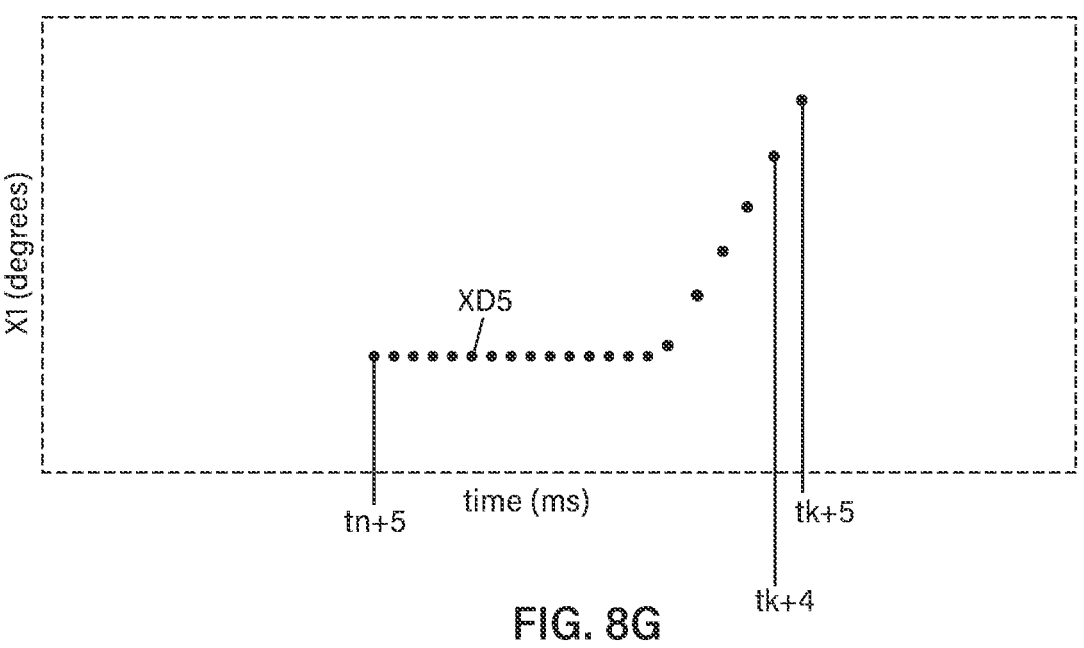

The process described herein can continue as the delay block 340 outputs new delayed trajectories XD. FIG. 8F shows a cumulative effect of adding (or stacking) six trajectory plans. The corresponding delayed trajectory $XD_5$ is shown in FIG. 8G. As shown in FIG. 8F, the smooth reference trajectory XF is following a smooth path, and the stacked trajectory plans are effective in smoothing the sharp corner shown in the delayed trajectory $XD_5$ in FIG. 8G.

A trajectory plan can be generated for each given delayed trajectory XD outputted by the delay block 304 even if the positional difference between the two most recent positions of the given delayed trajectory is zero (e.g., the future is on a horizontal line). In the scenario where the positional difference between the two most recent positions of the given delayed trajectory is zero, a zero scaled trajectory template will be generated. The new trajectory plan in this case will be the zero scaled trajectory plan plus the previous trajectory plan. Since the zero scaled trajectory plan has zero values, the new trajectory plan will simply have the same values as the previous trajectory plan, which means that the smooth reference trajectory XF will continue on the path provided by the previous trajectory plan.

The second preprocessing block 320 can prepare trajectory plans for each given delayed trajectory XD regardless of the value of dX (e.g., the positional difference between the two most recent positions of the delayed trajectory). For example, as explained above, the second preprocessing block 320 can compute trajectory plans using zero scaled trajectory templates in cases where dX=0. One advantage of this scheme is that the second preprocessing block 320 does not need to decide what value of dX corresponds to a sharp corner. Another advantage is that noise and sharp corner are treated alike and smoothed. Thus, the second preprocessing block 320 is effective in smoothing sharp corners and filtering out noise in the trajectory.

Figure 10:
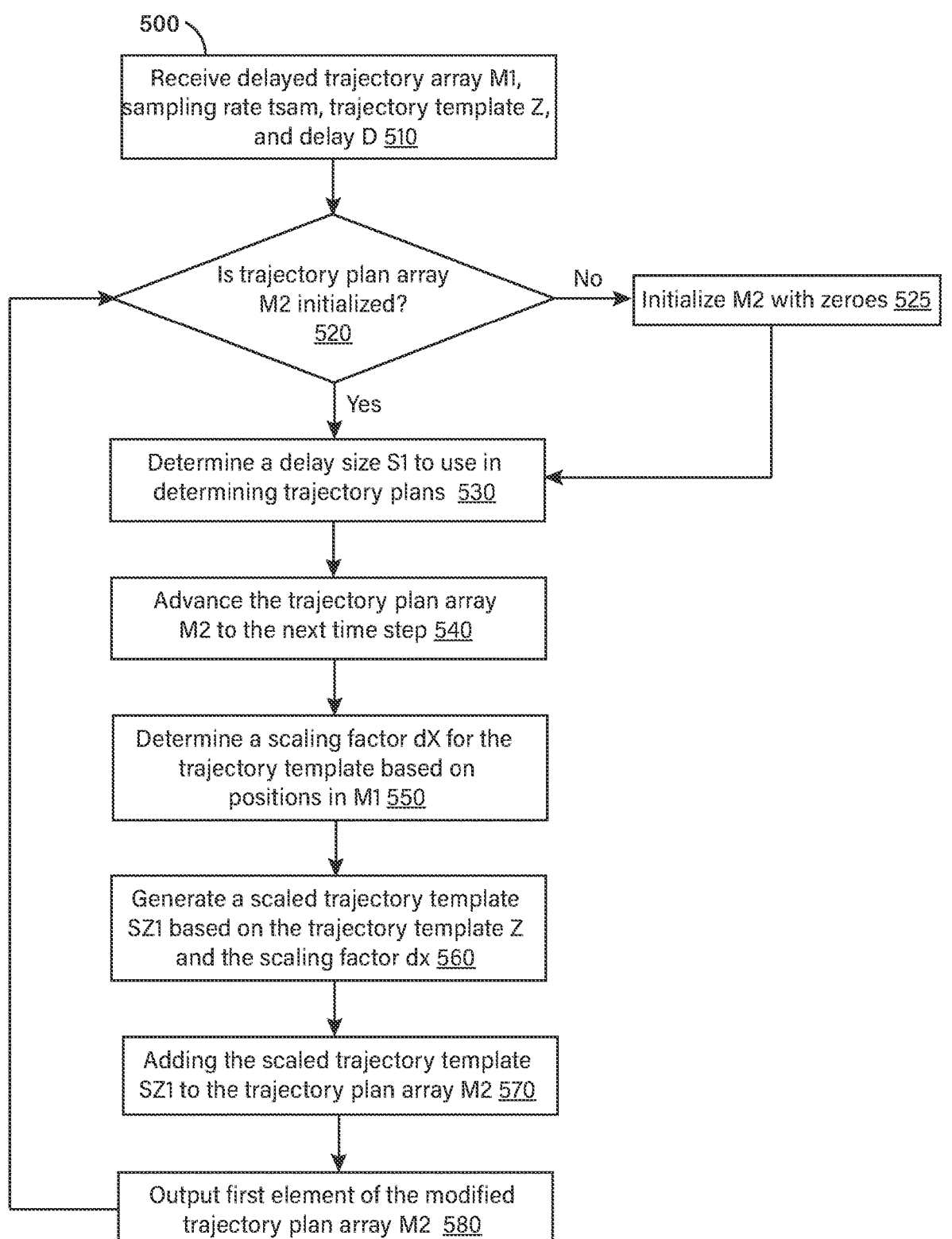
FIG. 10 is a flowchart illustrating a method of smoothing a trajectory.

FIG. 10 is a flowchart illustrating a method 500 of smoothing a trajectory as illustrated in FIGS. 8A-8E. The method 500 can be performed by the second preprocessing block 330 (shown in FIG. 3). The operations of the method 500 are illustrated in a particular order in FIG. 10, but the operations may be reordered and/or repeated and/or performed in parallel and/or replaced with equivalent operations as desired and appropriate.

At 510, the method 500 can include receiving a delayed trajectory array M1, a sampling rate $t_{sam}$, a trajectory template Z, and a delay D (e.g., at input nodes of the second trajectory processing block 320). The delayed trajectory array M1 can be an output of the delay block 340. The length of the delayed trajectory array M1 can be fixed as described in Example VI. The sampling rate $t_{sam}$ can be the same sampling rate provided to the first preprocessing block 310 and the trajectory generator 330. The trajectory template Z and delay D are received from the trajectory generator 330 as described in Example VII.

At 520, the method 500 can include determining if the trajectory plan array M2 has been initialized. If the trajectory plan array M2 has not been initialized (e.g., this is the first time the program is running after a reset or start-up), the method initializes the trajectory plan array M2 with zeroes, as shown at 525. The trajectory plan array M2 will hold values for the trajectory plan and will be updated at each time step.

At 530, the method 500 can include determining a delay size S1 to use in determining trajectory plans. The delay size S1 will determine the number of elements to use from the delayed trajectory array M1 in subsequent operations. In one example, the delay size S1 can be determined as the delay D provided in operation 510 divided by the sampling time $t_{sam}$ provided in operation 510. For example, if D is 0.5 seconds and $t_{sam}$ is 1 ms, then the delay size S1 will be 500. If the delayed trajectory array M1 has 1,000 elements, for example, then the most recent 500 of these 1,000 elements will be used. If the delayed trajectory array M1 is dynamically sized based on optimum delay size, operation 530 can be omitted, and all the elements in the delayed trajectory array M1 can be used in subsequent operations.

At 540, the method 500 can advance the trajectory plan array M2 to the next time step. For example, the array elements of the trajectory plan array M2 are shifted by one position to the left, and the first element is lost. As shown in operation 580, the first element that is lost would have been the output value of the second preprocessing block 320 for the smooth reference trajectory at the previous time step.

At 550, the method 500 can determine a scaling factor dX for the trajectory template Z based on positions (or values) in the delayed trajectory array M1. In one example, the scaling factor is determined as the difference between the first two elements of the delayed trajectory array M1 (see dX1 in, for example, FIG. 8B), assuming that the first two elements of the delayed trajectory array M1 are the two most recent delayed positions in the delayed trajectory array M1.

At 560, the method 500 can generate a scaled trajectory template SZ1 based on the trajectory template Z provided in operation 510 and the scaling factor dX determined in operation 550. In one example, the scaled trajectory template SZ1 can be generated by creating a copy of the trajectory template Z and multiplying the positions in the copy of the trajectory template Z by the scaling factor dX.

At 570, the method 500 can include adding the scaled trajectory template SZ1 to the trajectory plan array M2. This corresponds to stacking a scaled trajectory template on top of a previous trajectory plan as illustrated in FIGS. 8E and 8F.

At 580, the method 500 can include outputting the value of the first element of the trajectory plan array M2 as modified in operation 570 as the next position in the smooth reference trajectory. The method can return to operation 510 to receive and process the next delayed trajectory array M1.

The second preprocessing block 330 can include a function that implements the method 500. The second preprocessing block 330 can take an input trajectory with temporally-spaced positions (e.g., the delayed trajectory from the delay block 340) and output a smooth reference trajectory that is smooth. The second preprocessing block 330 can filter noise out of the input trajectory while smoothing the input trajectory such that the outputted smooth reference trajectory is both smooth and noiseless.

Figure 11:
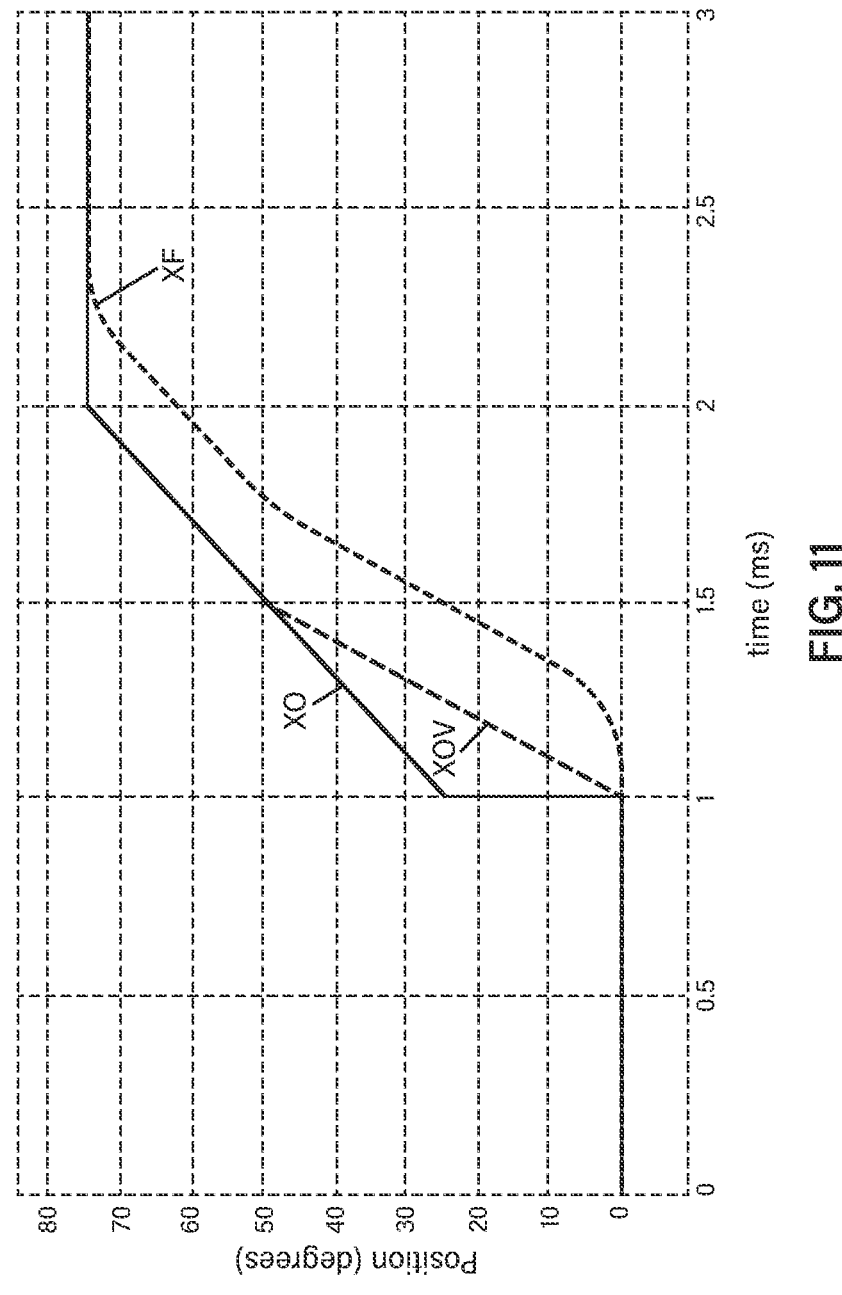
FIG. 11 is a graph illustrating a smooth reference trajectory generated by the method shown in FIG. 10.

FIG. 11 shows an example of the output of the second preprocessing block 330 for the hypothetical original reference trajectory considered in Example V. As shown, the second preprocessing block 330 successfully smooths sharp corners in the velocity-constrained reference trajectory XOV generated from the original reference trajectory XO. The smooth reference trajectory XF is delayed relative to the velocity-constrained reference trajectory XOV/original reference trajectory XO due to use of future knowledge extracted from delayed trajectories outputted by the delay block 340. The delay time can be reduced by selecting an aggressive trajectory template as described in Example VII.

The second preprocessing block 330 can be implemented in any combination of hardware, software, or firmware. In some examples, the second preprocessing block 330 can be implemented as a program executed by a controller (e.g., a microcontroller). The second preprocessing block 330, or function(s) implemented therein, can be stored in one or more computer-readable storage media or computer-readable storage devices and executed by one or more processor units. The second preprocessing block 330 can be generic to the specifics of operating systems or hardware and can be applied in any variety of environments to take advantage of the described features.

Example IX—Example Method Implementing Smooth Reference Trajectory Generation

Figure 12:
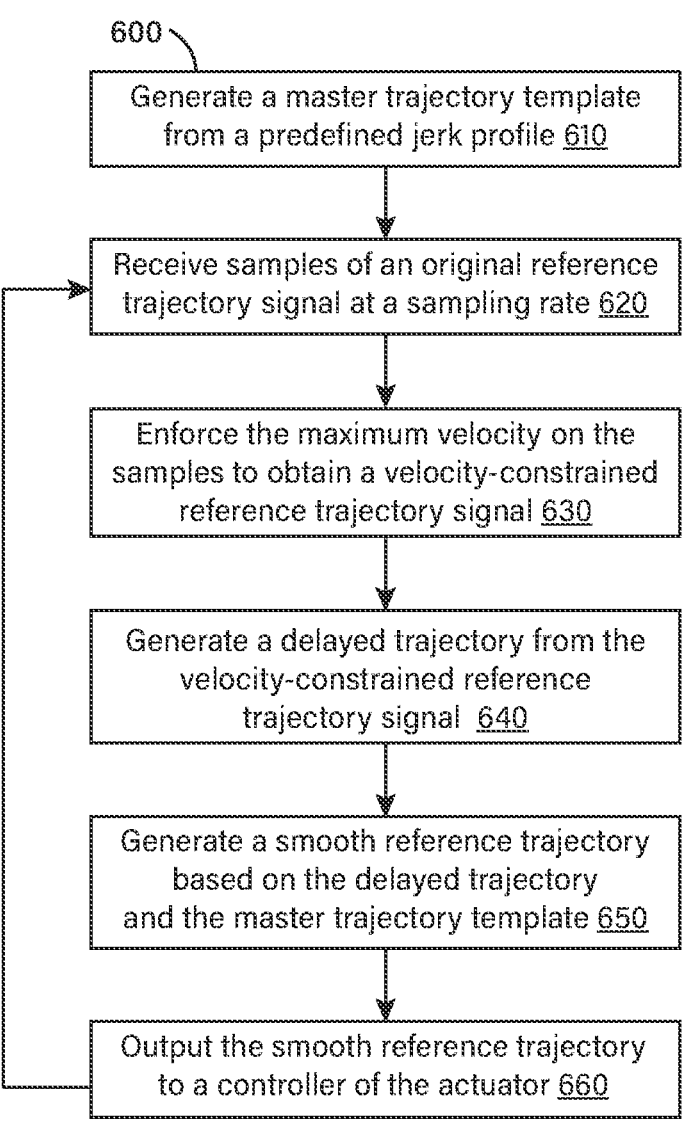
FIG. 12 is a flowchart illustrating a method of generating a smooth reference trajectory from an original reference trajectory.

FIG. 12 is a flowchart illustrating an example method 600 implementing smooth reference trajectory generation. The method can be performed by the trajectory preprocessor 300 as described in Examples III to IX. The operations of the method are illustrated in a particular order in FIG. 12, but the operations may be reordered and/or repeated and/or performed in parallel and/or replaced with equivalent operations as desired and appropriate.

At 610, the method 600 can include generating a master trajectory template from a predefined jerk profile, as described in Example VII. A maximum velocity and maximum acceleration can be received and used to compute a delay. In some examples, the length of master trajectory template can be adjusted to be twice the delay. The predefined jerk profile can depend on an acceleration factor, which can be adjusted to increase or decrease the aggressiveness of the master trajectory template in rounding a sharp corner. In some examples, the acceleration factor can range from 0 to 1, with 0 corresponding to most aggressive and 1 corresponding to least aggressive.

At 620, the method 600 can include receiving samples of an original reference trajectory signal at a sampling rate. For example, the high-level controller 270 (see FIG. 2 and Example III) can generate the original reference trajectory signal. The first preprocessor block 310 of the trajectory preprocessor 300 (see FIG. 3 and Example IV) can sample the original reference trajectory signal at the sampling rate. In some examples, the original reference trajectory signal includes temporally-spaced reference positions for an actuator. Each sample of the original reference trajectory signal can include one of the reference positions.

At 630, the method 600 can include enforcing a maximum velocity on the original reference trajectory signal to obtain a velocity-constrained reference trajectory signal. For example, the first preprocessor block 310 can receive a maximum velocity of the actuator from a user of the actuator (e.g., the robot system) and generate the velocity-constrained reference trajectory signal as described in Example V. The velocity-constrained reference trajectory signal can be generated as the samples of the original reference trajectory are received. For example, for each sample of the original reference trajectory signal received in operation 610, a portion of the velocity-constrained reference trajectory signal is generated. A given sample of the original reference trajectory signal has a given value for a given reference position. The portion of the velocity-constrained reference trajectory signal corresponding to the given sample can have the given value for the given reference position or a new value. A new value is determined if the given value would result in a velocity that exceeds the maximum velocity. A new value can be determined as described in Example V and FIG. 5.

At 640, the method 600 can include generating a delayed trajectory comprising a plurality of delayed signals sampled from the velocity-constrained reference trajectory. The delayed trajectory can be generated as described in Example VI, for example, using a tapped delay. In some examples, the delayed trajectory is used as an input to the second preprocessing block 320 (see Example IV and FIG. 3).

At 650, the method 600 can include generating a smooth reference trajectory based on the delayed trajectory and the master trajectory template. For example, the second preprocessing block 320 can receive the delayed trajectory and the master trajectory template and generate the smooth reference trajectory as described in Example VIII. For example, for each delayed trajectory that the second preprocessing block 320 receives, the second preprocessing block 320 determines a positional difference between two delayed signals (e.g., the two most current delayed signals) of the delayed trajectory and generates a scaled trajectory plan from the master trajectory template using the positional difference. The second preprocessing block 320 then determines the next value to include in the smooth reference trajectory signal based on the scaled trajectory plan and a previous trajectory plan, as described in Example VIII.

At 660, the method 600 can include outputting the smooth reference trajectory signal to a controller of the actuator. The next value of the smooth reference trajectory signal can be made available at the output of the second preprocessing block 320 after it has been determined as described in operation 650.

Operations 630-660 can be performed on each sample of the original reference trajectory signal received in operation 620. The same master trajectory template can be used in repeats of operations 630-660 or recomputed (e.g., if any of the maximum velocity, maximum acceleration, and acceleration factor changes).

The method can be implemented by a wide range of hardware, software, and/or firmware. For example, the method can be implemented in one or more application-specific integrated circuit(s), standard integrated circuit(s), computer program(s) executed by any number of computers, programs executed by any number of controllers, and/or programs executed by any number of processors, as well as in firmware, and in any combination of the foregoing.

ADDITIONAL EXAMPLES

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A method of controlling an actuator having a maximum velocity and a maximum acceleration comprising accessing a reference trajectory signal comprising temporally-spaced reference positions for the actuator; accessing a trajectory template having at least a third derivative continuity and at least one characteristic constrained by the maximum velocity and the maximum acceleration; generating a smooth reference trajectory signal based on the reference trajectory signal and the trajectory template; and outputting the smooth reference trajectory signal, wherein controls for the actuator are generated based on the smooth reference trajectory signal.

Example 2: A method according to any example described herein, particularly Example 1, further comprising enforcing the maximum velocity on the reference trajectory signal prior to generating the smooth reference trajectory signal based on the reference trajectory signal and the trajectory template.

Example 3: A method according to any example described herein, particularly any of Examples 1-2, further comprising generating the trajectory template from a jerk profile comprising a sequence of alternating non-zero-jerk segments and zero-jerk segments.

Example 4: A method according to any example described herein, particularly any one of Examples 1-3, wherein generating the smooth reference trajectory signal based on the reference trajectory signal and the trajectory template includes generating a delayed trajectory comprising an array of delayed signals sampled from the reference trajectory signal, and generating the smooth reference trajectory signal based on the delayed trajectory and the trajectory template.

Example 5: A method according to any example described herein, particularly any one of Examples 1-4, wherein the smooth reference trajectory signal is outputted to a controller of the actuator.

Example 6: A method of controlling an actuator comprising generating a trajectory template having at least a third derivative continuity and at least one characteristic constrained by a maximum velocity and a maximum acceleration associated with the actuator; generating a delayed trajectory from a first reference trajectory signal comprising first temporally-spaced reference positions, wherein the delayed trajectory comprises an array of delayed signals sampled from the first reference trajectory signal at a first sampling rate; generating a smooth reference trajectory signal based on the delayed trajectory and the trajectory template, and outputting the smooth reference trajectory signal, wherein controls for the actuator are generated based on the smooth reference trajectory signal.

Example 7: A method according to any example herein, particularly Example 6, further comprising: receiving a second reference trajectory signal comprising second temporally-spaced reference positions for the actuator; and deriving the first reference trajectory signal from the second reference trajectory signal.

Example 8: A method according to any example herein, particularly Example 7, wherein receiving the second reference trajectory signal comprises sampling the second reference trajectory signal at a second sampling rate; and wherein deriving the first reference trajectory signal from the second reference trajectory signal comprises enforcing the maximum velocity on the second reference trajectory signal to obtain the first reference trajectory signal.

Example 9: A method according to any example herein, particularly Example 8, wherein enforcing the maximum velocity on the second reference trajectory signal to obtain the first reference trajectory signal comprises determining that a slope of the second reference trajectory signal at a given reference position represented by a given sample of the second reference trajectory signal exceeds a threshold; determining a new value for the given reference position such that the slope of the second reference trajectory signal at the new value does not exceed the threshold; and generating a portion of the first reference trajectory signal corresponding to the given sample of the second reference trajectory signal using the new value for the given reference position.

Example 10: A method according to any example herein, particularly Example 9, wherein the threshold is the maximum velocity.

Example 11: A method according to any example herein, particularly Example 9, wherein the new value for the given reference position is determined such that the slope at the new value for the given reference position is equal to the maximum velocity.

Example 12: A method according to any example herein, particularly Example 8, wherein enforcing the maximum velocity on the second reference trajectory signal to obtain the first reference trajectory signal comprises replacing a step function in the second reference trajectory signal with a ramp having a ramp rate equal to the maximum velocity.

Example 13: A method according to any example herein, particularly Example 8, wherein the smooth reference trajectory signal is outputted to a controller of the actuator, and wherein sampling the second reference trajectory signal at the second sampling rate comprises sampling the second reference trajectory signal from an output of a controller at a higher level compared to the controller of the actuator.

Example 14: A method according to any example herein, particularly Example 8, wherein the smooth reference trajectory signal is outputted to a controller of the actuator, and wherein sampling the second reference trajectory signal at the second sampling rate comprises sampling the second reference trajectory signal from an output of a controller communicatively coupled to a robot.

Example 15: A method according to any example herein, particularly Example 6, wherein generating the smooth reference trajectory signal based on the delayed trajectory and the trajectory template comprises: determining a delay time from a ratio of the maximum velocity to the maximum acceleration; and determining a number of the plurality of delayed signals to use in generating the smooth reference trajectory based on the delay time and the first sampling rate.

Example 16: A method according to any example herein, particularly Example 15, wherein the at least one characteristic is a time length of the trajectory template, and further comprising determining the time length of the trajectory template based on the delay time.

Example 17: A method according to any example herein, particularly Example 15, wherein the time length of the trajectory template is determined as twice the delay time.

Example 18: A method according to any example herein, particularly Example 6, wherein generating the smooth reference trajectory signal based on the delayed trajectory and the trajectory template comprises: determining a position difference between a first delayed signal and a second delayed signal from the array of the delayed signals at a current time step; generating a scaled trajectory template based on the trajectory template and the position difference; and generating a trajectory plan at the current time step based on the scaled trajectory template and a trajectory plan at a previous time step.

Example 19: A method according to any example herein, particularly Example 18, wherein the first delayed signal and the second delayed signal have a least amount of delay in the array of the delayed signals.

Example 20: A method according to any example herein, particularly Example 18, wherein the trajectory plan at the previous time step does not exist, and further includes forming the trajectory plan at the previous time step from the delayed trajectory prior to generating the trajectory plan at the current time step.

Example 21: A method according to any example herein, particularly Example 18, wherein outputting the smooth reference trajectory includes outputting a value from the trajectory plan at the current time step.

Example 22: A method according to any example herein, particularly Example 6, wherein adjusting at least one characteristic of the trajectory template based on the maximum velocity and the maximum acceleration associated with the actuator comprises adjusting a time length of the trajectory template.

Example 23: A method according to any example herein, particularly Example 6, wherein the jerk profile comprises a sequence of alternating non-zero-jerk segments and zero-jerk segments.

Example 24: A method according to any example herein, particularly Example 23, wherein each non-zero-jerk segment has a first time length and each zero-jerk segment has a second time length, and wherein a ratio of the first time length to the second time length is in a range from 0 to 1.

Example 25: A method according to any example herein, particularly Example 24, wherein the ratio of the first time length to the second time length is 0.5 or less.

Example 26: A method according to any example herein, particularly any one of Examples 6-25, wherein the smooth reference trajectory signal is outputted to a controller of the actuator.

Example 27: A system comprising: an actuator comprising a motor and a motor driver, wherein the actuator has a maximum velocity and a maximum acceleration; a first controller configured to output a first reference trajectory signal comprising temporally-spaced reference positions; a second controller configured to generate controls for the motor driver based on a smooth reference trajectory signal; a trajectory preprocessor communicatively coupled to the first controller and the second controller, wherein the trajectory preprocessor comprises: a first processing block configured to receive samples of the first reference trajectory signal outputted by the first controller and enforce the maximum velocity on the samples of the first reference trajectory signal to obtain a second reference trajectory signal; a second processing block configured to generate a delayed trajectory comprising an array of delayed signals sampled from the second reference trajectory signal; a third processing block configured to generate a trajectory template having at least a third derivative continuity and at least one characteristic constrained by the maximum velocity and the maximum acceleration; and a fourth processing block configured to generate the smooth reference trajectory signal based on the delayed trajectory and the trajectory template.

Example 28: A system according to any example herein, particularly Example 27, wherein the second controller comprises an impedance controller.

Example 29: A system according to any example herein, particularly any one of Examples 27-28, wherein the third processing block comprises a tapped delay block.

Example 30: A system according to any example herein, particularly any one of Examples 27-29, wherein the actuator is coupled to a joint of a robot, and wherein the first controller is communicatively coupled to a tele-operator system or a cognitive platform associated with the robot.

Example 31: One or more non-transitory computer-readable storage media storing computer-executable instructions that when executed perform operations comprising: receiving samples of an original reference trajectory signal at a sampling rate from a high-level controller, wherein the original reference trajectory signal comprises temporally-spaced reference positions for an actuator; enforcing a maximum velocity on the samples of the original reference trajectory signal to obtain a velocity-constrained reference trajectory signal; generating a delayed trajectory comprising a plurality of delayed signals sampled from the velocity-constrained reference trajectory signal; generating a master trajectory template from a jerk profile; generating a smooth reference trajectory signal based on the delayed trajectory and the master trajectory template; and outputting the smooth reference trajectory signal to a low-level controller, wherein the low-level controller generates a control for a motor driver of the actuator based on the smooth reference trajectory signal.

The invention claimed is:

1. A method comprising:

obtaining a first reference trajectory signal comprising first temporally-spaced reference positions for an actuator of a robot;

generating a trajectory template having at least a third derivative continuity and at least one characteristic constrained by a maximum velocity and a maximum acceleration associated with the actuator;

generating a delayed trajectory from the first reference trajectory signal comprising first temporally-spaced reference positions, wherein the delayed trajectory comprises an array of delayed signals sampled from the first reference trajectory signal at a first sampling rate;

generating a smooth reference trajectory signal based on the delayed trajectory and the trajectory template;

generating controls for the actuator based on the smooth reference trajectory signal; and outputting the controls for the actuator to a driver of the actuator.

2. The method of claim 1, further comprising:

receiving a second reference trajectory signal comprising second temporally-spaced reference positions for the actuator; and deriving the first reference trajectory signal from the second reference trajectory signal.

3. The method of claim 2, wherein receiving the second reference trajectory signal comprises sampling the second reference trajectory signal at a second sampling rate, and wherein deriving the first reference trajectory signal from the second reference trajectory signal comprises enforcing the maximum velocity on the second reference trajectory signal to obtain the first reference trajectory signal.

4. The method of claim 3, wherein enforcing the maximum velocity on the second reference trajectory signal to obtain the first reference trajectory signal comprises:

determining that a slope of the second reference trajectory signal at a given reference position represented by a given sample of the second reference trajectory signal exceeds a threshold;

determining a new value for the given reference position such that the slope of the second reference trajectory signal at the new value does not exceed the threshold; and generating a portion of the first reference trajectory signal corresponding to the given sample of the second reference trajectory signal using the new value for the given reference position.

5. The method of claim 4, wherein the threshold is the maximum velocity.

6. The method of claim 4, wherein the new value for the given reference position is determined such that the slope at the new value for the given reference position is equal to the maximum velocity.

7. The method of claim 3, wherein enforcing the maximum velocity on the second reference trajectory signal to obtain the first reference trajectory signal comprises replacing a step function in the second reference trajectory signal with a ramp having a ramp rate equal to the maximum velocity.

8. The method of claim 3, wherein the smooth reference trajectory signal is outputted to a controller of the actuator, and wherein sampling the second reference trajectory signal at the second sampling rate comprises sampling the second reference trajectory signal from an output of a controller at a higher level compared to the controller of the actuator.

9. The method of claim 1, wherein generating the smooth reference trajectory signal based on the delayed trajectory and the trajectory template comprises:

determining a delay time from a ratio of the maximum velocity to the maximum acceleration; and determining a number of the plurality of delayed signals to use in generating the smooth reference trajectory based on the delay time and the first sampling rate.

10. The method of claim 9, wherein the at least one characteristic is a time length of the trajectory template, and further comprising determining the time length of the trajectory template based on the delay time.

11. The method of claim 9, wherein the time length of the trajectory template is determined as twice the delay time.

12. The method of claim 1, wherein generating the smooth reference trajectory signal based on the delayed trajectory and the trajectory template comprises:

determining a position difference between a first delayed signal and a second delayed signal from the array of the delayed signals at a current time step;

generating a scaled trajectory template based on the trajectory template and the position difference; and generating a trajectory plan at the current time step based on the scaled trajectory template and a trajectory plan at a previous time step.

13. The method of claim 12, wherein the first delayed signal and the second delayed signal have a least amount of delay in the array of the delayed signals.

14. The method of claim 12, wherein the trajectory plan at the previous time step does not exist, and further comprising forming the trajectory plan at the previous time step from the delayed trajectory prior to generating the trajectory plan at the current time step.

15. The method of claim 12, wherein outputting the smooth reference trajectory comprises outputting a value from the trajectory plan at the current time step.

16. The method of claim 1, wherein adjusting at least one characteristic of the trajectory template based on the maximum velocity and the maximum acceleration associated with the actuator comprises adjusting a time length of the trajectory template.

17. The method of claim 1, further comprising generating the trajectory template from a jerk profile comprising a sequence of alternating non-zero-jerk segments and zero-jerk segments.

18. The method of claim 17, wherein each non-zero-jerk segment has a first time length and each zero-jerk segment has a second time length, and wherein a ratio of the first time length to the second time length is in a range from 0 to 1.

19. The method of claim 18, wherein the ratio of the first time length to the second time length is 0.5 or less.

20. A system comprising:

an actuator coupled to a joint of a robot, the actuator comprising a motor and a motor driver, wherein the actuator has a maximum velocity and a maximum acceleration associated therewith;

a computing system communicatively coupled to the robot, the computing system comprising one or more hardware processors and one or more computer-readable storage devices that store computer-readable instructions executed by the one or more hardware processors;

a first controller implemented in the computing system, the first controller configured to output a first reference trajectory signal comprising temporally-spaced reference positions for the actuator;

a second controller implemented in the computer system, the second controller configured to receive a smooth reference trajectory signal and generate controls for the motor driver based on the smooth reference trajectory signal; and a trajectory preprocessor implemented in the computer system and communicatively coupled to the first controller and the second controller, wherein the trajectory preprocessor comprises:

a first preprocessing block configured to receive samples of the first reference trajectory signal outputted by the first controller and enforce the maximum velocity on the samples of the first reference trajectory signal to obtain a second reference trajectory signal;

a second preprocessing block configured to generate a delayed trajectory comprising an array of delayed signals sampled from the second reference trajectory signal;

a third preprocessing block configured to generate a trajectory template having at least a third derivative continuity and at least one characteristic constrained by the maximum velocity and the maximum acceleration; and a fourth preprocessing block configured to generate the smooth reference trajectory signal based on the delayed trajectory and the trajectory template and output the smooth reference trajectory signal.

21. The system of claim 20, wherein the second controller comprises an impedance controller.

22. The system of claim 20, wherein the third preprocessing block comprises a tapped delay block.

23. The system of claim 20, wherein the first controller is communicatively coupled to a teleoperator system or a cognitive platform associated with the robot and outputs the first reference trajectory signal based on commands from the teleoperator system or the cognitive platform.

\* \* \* \* \*